United States Patent
Zhang et al.

(10) Patent No.: US 11,032,831 B2
(45) Date of Patent: Jun. 8, 2021

(54) HANDLING MISSED HYBRID AUTOMATIC REPEAT REQUEST (HARQ) OPPORTUNITIES, MULTIPLE HARQ OPPORTUNITIES, OR BOTH FOR DISCONTINUOUS RECEPTION (DRX)

(71) Applicant: QUALCOMM Incorporated, San Diego, CA (US)

(72) Inventors: Xiaoxia Zhang, San Diego, CA (US); Ozcan Ozturk, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/987,920

(22) Filed: Aug. 7, 2020

(65) Prior Publication Data
US 2021/0058945 A1    Feb. 25, 2021

Related U.S. Application Data

(60) Provisional application No. 62/891,242, filed on Aug. 23, 2019.

(51) Int. Cl.
*H04L 1/18*    (2006.01)
*H04W 72/12*    (2009.01)
(Continued)

(52) U.S. Cl.
CPC ....... *H04W 72/1242* (2013.01); *H04L 1/1812* (2013.01); *H04W 52/0225* (2013.01); *H04W 72/042* (2013.01)

(58) Field of Classification Search
CPC .................................................. H04W 74/00
See application file for complete search history.

(56) References Cited

U.S. PATENT DOCUMENTS 10,397,915 B2 *    8/2019    Hosseini ............... H04L 5/0051
2020/0045696 A1 *   2/2020    Huang .................. H04L 5/0094
2020/0106569 A1 *   4/2020    Tsai ...................... H04L 5/0055

FOREIGN PATENT DOCUMENTS

WO    WO-2018031327 A1    2/2018

OTHER PUBLICATIONS

"3rd Generation Partnership Project, Technical Specification Group Radio Access Network, Evolved Universal Terrestrial Radio Access (E-UTRA), Medium Access Control (MAC) protocol specification (Release 15)", 3GPP Standard, Technical Specification, 3GPP TS 36.321, 3rd Generation Partnership Project (3GPP), Mobile Competence Centre, 650, Route Des Lucioles, F-06921, Sophia-Antipolis Cedex, France, vol. RAN WG2, No. V15.6.0, Jun. 27, 2019 (Jun. 27, 2019), XP051754436, pp. 1-133, [retrieved on Jun. 27, 2019] section 1, section 3, section 5.1.

(Continued)

*Primary Examiner* — John D Blanton
(74) *Attorney, Agent, or Firm* — Holland & Hart LLP/Qualcomm

(57) ABSTRACT

This disclosure provides systems, methods, and apparatus, including computer programs encoded on computer storage media, for handling hybrid automatic repeat request (HARQ) processes with discontinuous reception (DRX) operations. A user equipment (UE) may use timers to maintain an ON duration in DRX. The UE may receive, via downlink control information (DCI), an indication of a feedback transmission opportunity (TxOP) for a HARQ process. The UE may activate a timer at the end of the TxOP regardless of whether the UE transmits feedback in the TxOP to ensure that the UE remains active. In some implementations, a base station may provide the UE with multiple opportunities to transmit a feedback message. The UE may reactivate a timer after each feedback TxOP for the same HARQ process or may activate the timer after the first (Continued)

feedback TxOP and may refrain from activating the timer after subsequent feedback TxOPs for the HARQ process.

30 Claims, 12 Drawing Sheets

(51) Int. Cl.
*H04W 72/04* (2009.01)
*H04W 52/02* (2009.01)

(56) References Cited

OTHER PUBLICATIONS

International Search Report and Written Opinion—PCT/US2020/045657—ISAEPO—dated Nov. 18, 2020.

* cited by examiner

HANDLING MISSED HYBRID AUTOMATIC REPEAT REQUEST (HARQ) OPPORTUNITIES, MULTIPLE HARQ OPPORTUNITIES, OR BOTH FOR DISCONTINUOUS RECEPTION (DRX)

CROSS-REFERENCE TO RELATED APPLICATION

This patent application claims priority to U.S. Provisional Patent Application No. 62/891,242 by Zhang et al., filed Aug. 23, 2019, entitled "HANDLING MISSED HYBRID AUTOMATIC REPEAT REQUEST (HARQ) OPPORTUNITIES, MULTIPLE HARQ OPPORTUNITIES, OR BOTH FOR DISCONTINUOUS RECEPTION (DRX)," and assigned to the assignee hereof. The disclosure of the prior application is considered part of and is incorporated by reference in this patent application.

TECHNICAL FIELD

This disclosure relates to wireless communications and to handling missed hybrid automatic repeat request (HARQ) opportunities, multiple HARQ opportunities, or both for discontinuous reception (DRX).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure may be implemented in an apparatus for wireless communications. The apparatus may include a first interface and a processing system. The first interface may be configured to obtain monitoring information for a downlink control channel while operating in an active state of a discontinuous reception (DRX) mode and obtain a downlink control information (DCI) message scheduling a downlink data message based on the monitoring information, where the DCI message indicates a feedback transmission opportunity (TxOP) for the downlink data message. The processing system may be configured to activate a first timer subsequent to the feedback TxOP for the downlink data message and based on an end of the feedback TxOP and activate a second timer upon expiration of the first timer, where the processing system remains in the active state of the DRX mode while the second timer is running.

Another innovative aspect of the subject matter described in this disclosure may be implemented in a method for wireless communications at an apparatus of a user equipment (UE). The method may include monitoring a downlink control channel while operating in an active state of a DRX mode and receiving, via the downlink control channel, a DCI message scheduling a downlink data message, where the DCI message indicates a feedback TxOP for the downlink data message. The method may further include activating a first timer subsequent to the feedback TxOP for the downlink data message and based on an end of the feedback TxOP, and activating a second timer upon expiration of the first timer, where the UE remains in the active state of the DRX mode while the second timer is running.

Another innovative aspect of the subject matter described in this disclosure may be implemented in an additional apparatus for wireless communications at a UE. The apparatus may include means for monitoring a downlink control channel while operating in an active state of a DRX mode and receiving, via the downlink control channel, a DCI message scheduling a downlink data message, where the DCI message indicates a feedback TxOP for the downlink data message. The apparatus may further include means for activating a first timer subsequent to the feedback TxOP for the downlink data message and based on an end of the feedback TxOP, and activating a second timer upon expiration of the first timer, where the UE remains in the active state of the DRX mode while the second timer is running.

Another innovative aspect of the subject matter described in this disclosure may be implemented in a non-transitory computer-readable medium storing code for wireless communications at a UE. The code may include instructions executable by a processor to monitor a downlink control channel while operating in an active state of a DRX mode and receive, via the downlink control channel, a DCI message scheduling a downlink data message, where the DCI message indicates a feedback TxOP for the downlink data message. The code may further include instructions executable by a processor to activate a first timer subsequent to the feedback TxOP for the downlink data message and based on an end of the feedback TxOP, and activate a second timer upon expiration of the first timer, where the UE remains in the active state of the DRX mode while the second timer is running.

Some implementations of the method, apparatuses, and non-transitory computer-readable medium described herein may further include operations, features, means, instructions, or processing systems configured for failing to successfully decode the downlink data message and determining feedback information for the downlink data message, where the feedback information includes a negative acknowledgment (NACK) for the downlink data message based on the UE failing to successfully decode the downlink data message, and where the first timer, the second timer, or both may be activated based on the feedback information including the NACK.

Some implementations of the method, apparatuses, and non-transitory computer-readable medium described herein may further include operations, features, means, instructions, or interfaces configured for refraining from transmitting or outputting a feedback message for the downlink data message in the feedback TxOP.

In some implementations of the method, apparatuses, and non-transitory computer-readable medium described herein, the feedback TxOP may be on an unlicensed channel. Some implementations of the method, apparatuses, and non-transitory computer-readable medium described herein may further include operations, features, means, instructions, or processing systems configured for performing a channel access procedure, such as a listen-before-talk or listen-before-transmit (LBT) procedure, for the feedback TxOP, where the refraining may be based on the UE or processing system failing the channel access procedure for the feedback TxOP.

In some implementations of the method, apparatuses, and non-transitory computer-readable medium described herein, the feedback TxOP may be on a licensed channel and the feedback message may correspond to a first priority value. Some implementations of the method, apparatuses, and non-transitory computer-readable medium described herein may further include operations, features, means, instructions, or processing systems configured for identifying a second TxOP for a second message at least partially overlapping the feedback TxOP, where the second message corresponds to a second priority value that is greater than the first priority value and the refraining may be based on the second message.

In some implementations of the method, apparatuses, and non-transitory computer-readable medium described herein, the feedback TxOP may be on a licensed channel. Some implementations of the method, apparatuses, and non-transitory computer-readable medium described herein may further include operations, features, means, instructions, or processing systems configured for identifying a second TxOP for a second message at least partially overlapping the feedback TxOP, where the second message preempts the feedback message and the refraining may be based on the second message.

Some implementations of the method, apparatuses, and non-transitory computer-readable medium described herein may further include operations, features, means, instructions, or interfaces configured for transmitting or outputting a feedback message for the downlink data message in the feedback TxOP.

In some implementations of the method, apparatuses, and non-transitory computer-readable medium described herein, the first timer may be a round-trip time (RTT) timer and may be activated in a first symbol in time after the feedback TxOP, and the second timer may be a retransmission timer and may be activated in a first symbol in time after the expiration of the RTT timer.

In some implementations of the method, apparatuses, and non-transitory computer-readable medium described herein, the RTT timer may be a drx-HARQ-RTT-TimerDL, and the retransmission timer may be a drx-RetransmissionTimerDL.

Some implementations of the method, apparatuses, and non-transitory computer-readable medium described herein may further include operations, features, means, instructions, or interfaces configured for receiving or obtaining, via the downlink control channel, an additional DCI message, where the additional DCI message indicates an additional feedback TxOP for the downlink data message subsequent to the feedback TxOP.

Some implementations of the method, apparatuses, and non-transitory computer-readable medium described herein may further include operations, features, means, instructions, or processing systems configured for reactivating the first timer subsequent to the additional feedback TxOP for the downlink data message and based on an end of the additional feedback TxOP and reactivating the second timer upon expiration of the reactivated first timer.

In some implementations of the method, apparatuses, and non-transitory computer-readable medium described herein, the second timer may be running at the expiration of the reactivated first timer based on activating the second timer upon the expiration of the first timer, and where reactivating the second timer may include operations, features, means, or instructions for resetting the second timer to a maximum second timer duration based on the expiration of the reactivated first timer.

In some implementations of the method, apparatuses, and non-transitory computer-readable medium described herein, the second timer may be running at the end of the additional feedback TxOP based on activating the second timer upon the expiration of the first timer. Some implementations of the method, apparatuses, and non-transitory computer-readable medium described herein may further include operations, features, means, instructions, or processing systems configured for stopping the second timer subsequent to the additional feedback TxOP based on reactivating the first timer and resetting the second timer to a maximum second timer duration based on the expiration of the reactivated first timer, where reactivating the second timer upon expiration of the reactivated first timer may be based on the resetting.

In some implementations of the method, apparatuses, and non-transitory computer-readable medium described herein, the first timer may be running at the end of the additional feedback TxOP based on activating the first timer subsequent to the feedback TxOP, and where reactivating the first timer may include operations, features, means, or instructions for resetting the first timer to a maximum first timer duration based on the end of the additional feedback TxOP.

Some implementations of the method, apparatuses, and non-transitory computer-readable medium described herein may further include operations, features, means, instructions, or processing systems configured for refraining from activating the first timer subsequent to the additional feedback TxOP for the downlink data message and based on activating the first timer subsequent to the feedback TxOP.

In some implementations of the method, apparatuses, and non-transitory computer-readable medium described herein, the DCI message may correspond to a first hybrid automatic repeat request (HARQ) process. Some implementations of the method, apparatuses, and non-transitory computer-readable medium described herein may further include operations, features, means, instructions, or processing systems configured for activating an additional timer subsequent to the additional feedback TxOP for the downlink data message and based on the additional DCI message corresponding to a second HARQ process different than the first HARQ process.

In some implementations of the method, apparatuses, and non-transitory computer-readable medium described herein, the additional DCI message includes a UE-specific uplink grant, a UE-specific downlink assignment, UE-specific control information, common UE control information, or a combination thereof.

Some implementations of the method, apparatuses, and non-transitory computer-readable medium described herein may further include operations, features, means, instructions, interfaces, or processing systems configured for identifying an expiration of a last timer maintaining the UE in the active state of the DRX mode, entering an inactive state of the DRX mode based on the expiration of the last timer, and refraining from monitoring the downlink control channel while in the inactive state of the DRX mode.

In some implementations of the method, apparatuses, and non-transitory computer-readable medium described herein, the feedback TxOP includes a downlink HARQ acknowledgment (ACK) feedback TxOP.

Another innovative aspect of the subject matter described in this disclosure may be implemented in an apparatus for wireless communications. The apparatus may include a first interface and a processing system. The first interface may be configured to output a first DCI message for a UE scheduling a downlink data message and indicating a feedback TxOP for the downlink data message. The processing system may be configured to determine an active time for the UE to monitor a downlink control channel based on an RTT timer and a retransmission timer, where the RTT timer is activated based on an end of the feedback TxOP. The first interface may be further configured to output a second DCI message for the UE during the determined active time for the UE.

Another innovative aspect of the subject matter described in this disclosure may be implemented in a method for wireless communications at an apparatus of a base station. The method may include transmitting, to a UE and via a downlink control channel, a first DCI message scheduling a downlink data message and indicating a feedback TxOP for the downlink data message and determining an active time for the UE to monitor the downlink control channel based on an RTT timer and a retransmission timer, where the RTT timer is activated based on an end of the feedback TxOP. The method may further include transmitting, to the UE and via the downlink control channel, a second DCI message during the determined active time for the UE.

Another innovative aspect of the subject matter described in this disclosure may be implemented in an additional apparatus for wireless communications at a base station. The apparatus may include means for transmitting, to a UE and via a downlink control channel, a first DCI message scheduling a downlink data message and indicating a feedback TxOP for the downlink data message and determining an active time for the UE to monitor the downlink control channel based on an RTT timer and a retransmission timer, where the RTT timer is activated based on an end of the feedback TxOP. The apparatus may further include means for transmitting or outputting, to the UE and via the downlink control channel, a second DCI message during the determined active time for the UE.

Another innovative aspect of the subject matter described in this disclosure may be implemented in a non-transitory computer-readable medium storing code for wireless communications at a base station. The code may include instructions executable by a processor to transmit, to a UE and via a downlink control channel, a first DCI message scheduling a downlink data message and indicating a feedback TxOP for the downlink data message and determine an active time for the UE to monitor the downlink control channel based on an RTT timer and a retransmission timer, where the RTT timer is activated based on an end of the feedback TxOP. The code may further include instructions executable by the processor to transmit, to the UE and via the downlink control channel, a second DCI message during the determined active time for the UE.

In some implementations of the method, apparatuses, and non-transitory computer-readable medium described herein, the RTT timer may be activated subsequent to the feedback TxOP for the downlink data message and based on the end of the feedback TxOP, and the retransmission timer may be activated based on an expiration of the RTT timer.

In some implementations of the method, apparatuses, and non-transitory computer-readable medium described herein, the second DCI message indicates a second feedback TxOP for the downlink data message subsequent to the feedback TxOP.

In some implementations of the method, apparatuses, and non-transitory computer-readable medium described herein, determining the active time for the UE further may include operations, features, means, instructions, interfaces, or processing systems configured for determining the active time for the UE to monitor the downlink control channel based on the RTT timer being reactivated subsequent to the second feedback TxOP for the downlink data message and based on an end of the second feedback TxOP and the retransmission timer being reactivated based on a second expiration of the RTT timer.

In some implementations of the method, apparatuses, and non-transitory computer-readable medium described herein, determining the active time for the UE further may include operations, features, means, instructions, interfaces, or processing systems configured for determining the active time for the UE to monitor the downlink control channel based on the RTT timer remaining deactivated subsequent to the second feedback TxOP for the downlink data message and based on the second feedback TxOP being subsequent to the feedback TxOP.

In some implementations of the method, apparatuses, and non-transitory computer-readable medium described herein, the RTT timer may be a drx-HARQ-RTT-TimerDL, and the retransmission timer may be a drx-RetransmissionTimerDL.

In some implementations of the method, apparatuses, and non-transitory computer-readable medium described herein, the feedback TxOP includes a downlink HARQ-ACK feedback TxOP.

Another innovative aspect of the subject matter described in this disclosure may be implemented in an apparatus for wireless communications. The apparatus may include a first interface and a processing system. The first interface may be configured to obtain a first DCI message scheduling a downlink data message, where the first DCI message indicates a first feedback TxOP for a HARQ process for the downlink data message. The processing system may be configured to activate an RTT timer corresponding to the HARQ process subsequent to the first feedback TxOP for the downlink data message and based on an end of the first feedback TxOP. The first interface may be further configured to obtain a second DCI message indicating a second feedback TxOP for the HARQ process for the downlink data message subsequent to the first feedback TxOP. The processing system may be further configured to reactivate the RTT timer corresponding to the HARQ process subsequent to the second feedback TxOP for the downlink data message and based on an end of the second feedback TxOP.

Another innovative aspect of the subject matter described in this disclosure may be implemented in a method for wireless communications at an apparatus of a UE. The method may include receiving a first DCI message scheduling a downlink data message, where the first DCI message indicates a first feedback TxOP for a HARQ process for the downlink data message, and activating an RTT timer corresponding to the HARQ process subsequent to the first feedback TxOP for the downlink data message and based on an end of the first feedback TxOP. The method may further include receiving a second DCI message indicating a second feedback TxOP for the HARQ process for the downlink data message subsequent to the first feedback TxOP, and reactivating the RTT timer corresponding to the HARQ process subsequent to the second feedback TxOP for the downlink data message and based on an end of the second feedback TxOP.

Another innovative aspect of the subject matter described in this disclosure may be implemented in an additional apparatus for wireless communications at a UE. The apparatus may include means for receiving a first DCI message scheduling a downlink data message, where the first DCI message indicates a first feedback TxOP for a HARQ process for the downlink data message, and activating an RTT timer corresponding to the HARQ process subsequent to the first feedback TxOP for the downlink data message and based on an end of the first feedback TxOP. The apparatus may further include means for receiving a second DCI message indicating a second feedback TxOP for the HARQ process for the downlink data message subsequent to the first feedback TxOP, and reactivating the RTT timer corresponding to the HARQ process subsequent to the second feedback TxOP for the downlink data message and based on an end of the second feedback TxOP.

Another innovative aspect of the subject matter described in this disclosure may be implemented in an additional apparatus for wireless communications at a UE. The code may include instructions executable by a processor to receive a first DCI message scheduling a downlink data message, where the first DCI message indicates a first feedback TxOP for a HARQ process for the downlink data message, and activate an RTT timer corresponding to the HARQ process subsequent to the first feedback TxOP for the downlink data message and based on an end of the first feedback TxOP. The code may further include instructions executable by the processor to receive a second DCI message indicating a second feedback TxOP for the HARQ process for the downlink data message subsequent to the first feedback TxOP, and reactivate the RTT timer corresponding to the HARQ process subsequent to the second feedback TxOP for the downlink data message and based on an end of the second feedback TxOP.

Some implementations of the method, apparatuses, and non-transitory computer-readable medium described herein may further include operations, features, means, instructions, or interfaces configured for monitoring or obtaining monitoring information for a downlink control channel while operating in an active state of a DRX mode, where receiving or obtaining the first DCI message and receiving or obtaining the second DCI message may be based on the monitoring.

Some implementations of the method, apparatuses, and non-transitory computer-readable medium described herein may further include operations, features, means, instructions, or processing systems configured for identifying a first expiration of the RTT timer based on activating the RTT timer, activating a retransmission timer based on the first expiration of the RTT timer, where the UE or processing system operates in the active state of the DRX mode based on the activated retransmission timer, identifying a second expiration of the RTT timer based on reactivating the RTT timer, and reactivating the retransmission timer based on the second expiration of the RTT timer, where the UE or processing system operates in the active state of the DRX mode based on the reactivated retransmission timer.

In some implementations of the method, apparatuses, and non-transitory computer-readable medium described herein, the retransmission timer may be running at the second expiration of the RTT timer based on activating the retransmission timer, and where reactivating the retransmission timer may include operations, features, means, instructions, or processing systems configured for resetting the retransmission timer to a maximum timer duration based on the second expiration of the RTT timer.

In some implementations of the method, apparatuses, and non-transitory computer-readable medium described herein, the retransmission timer may be running at the reactivation of the RTT timer based on activating the retransmission timer. Some implementations of the method, apparatuses, and non-transitory computer-readable medium described herein may further include operations, features, means, instructions, or processing systems configured for stopping the retransmission timer subsequent to the second feedback TxOP based on reactivating the RTT timer and resetting the retransmission timer to a maximum timer duration based on the second expiration of the RTT timer, where reactivating the retransmission timer may be based on the resetting.

Some implementations of the method, apparatuses, and non-transitory computer-readable medium described herein may further include operations, features, means, instructions, or interfaces configured for transmitting or outputting a first feedback message for the downlink data message in the first feedback TxOP, where activating the RTT timer may be based on transmitting or outputting the first feedback message, and transmitting or outputting a second feedback message for the downlink data message in the second feedback TxOP, where reactivating the RTT timer may be based on transmitting or outputting the second feedback message.

Another innovative aspect of the subject matter described in this disclosure may be implemented in an apparatus for wireless communications. The apparatus may include a first interface and a processing system. The first interface may be configured to obtain a first DCI message scheduling a downlink data message, where the first DCI message indicates a first feedback TxOP for a HARQ process for the downlink data message. The processing system may be configured to activate an RTT timer corresponding to the HARQ process subsequent to the first feedback TxOP for the downlink data message and based on an end of the first feedback TxOP. The first interface may be further configured to obtain a second DCI message indicating a second feedback TxOP for the HARQ process for the downlink data message subsequent to the first feedback TxOP. The processing system may be further configured to refrain from reactivating the RTT timer corresponding to the HARQ process subsequent to the second feedback TxOP for the downlink data message and based on an end of the second feedback TxOP being subsequent to the end of the first feedback TxOP.

Another innovative aspect of the subject matter described in this disclosure may be implemented in a method for wireless communications at an apparatus of a UE. The method may include receiving a first DCI message scheduling a downlink data message, where the first DCI message indicates a first feedback TxOP for a HARQ process for the downlink data message, and activating an RTT timer corresponding to the HARQ process subsequent to the first feedback TxOP for the downlink data message and based on an end of the first feedback TxOP. The method may further include receiving a second DCI message indicating a second feedback TxOP for the HARQ process for the downlink data message subsequent to the first feedback TxOP, and refraining from reactivating the RTT timer corresponding to the HARQ process subsequent to the second feedback TxOP for the downlink data message and based on an end of the second feedback TxOP being subsequent to the end of the first feedback TxOP.

Another innovative aspect of the subject matter described in this disclosure may be implemented in an additional apparatus for wireless communications at a UE. The apparatus may include means for receiving a first DCI message scheduling a downlink data message, where the first DCI message indicates a first feedback TxOP for a HARQ process for the downlink data message, and activating an RTT timer corresponding to the HARQ process subsequent to the first feedback TxOP for the downlink data message and based on an end of the first feedback TxOP. The apparatus may further include means for receiving a second DCI message indicating a second feedback TxOP for the HARQ process for the downlink data message subsequent to the first feedback TxOP, and refraining from reactivating the RTT timer corresponding to the HARQ process subsequent to the second feedback TxOP for the downlink data message and based on an end of the second feedback TxOP being subsequent to the end of the first feedback TxOP.

Another innovative aspect of the subject matter described in this disclosure may be implemented in a non-transitory computer-readable medium storing code for wireless communications at a UE. The code may include instructions executable by a processor to receive a first DCI message scheduling a downlink data message, where the first DCI message indicates a first feedback TxOP for a HARQ process for the downlink data message, and activate an RTT timer corresponding to the HARQ process subsequent to the first feedback TxOP for the downlink data message and based on an end of the first feedback TxOP. The code may further include instructions executable by the processor to receive a second DCI message indicating a second feedback TxOP for the HARQ process for the downlink data message subsequent to the first feedback TxOP, and refrain from reactivating the RTT timer corresponding to the HARQ process subsequent to the second feedback TxOP for the downlink data message and based on an end of the second feedback TxOP being subsequent to the end of the first feedback TxOP.

Some implementations of the method, apparatuses, and non-transitory computer-readable medium described herein may further include operations, features, means, instructions, or interfaces configured for transmitting or outputting a first feedback message for the downlink data message in the first feedback TxOP, where activating the RTT timer may be based on transmitting or outputting the first feedback message, and transmitting or outputting a second feedback message for the downlink data message in the second feedback TxOP, where refraining from reactivating the RTT timer may be based on transmitting or outputting the second feedback message in the second feedback TxOP subsequent to transmitting or outputting the first feedback message in the first feedback TxOP.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
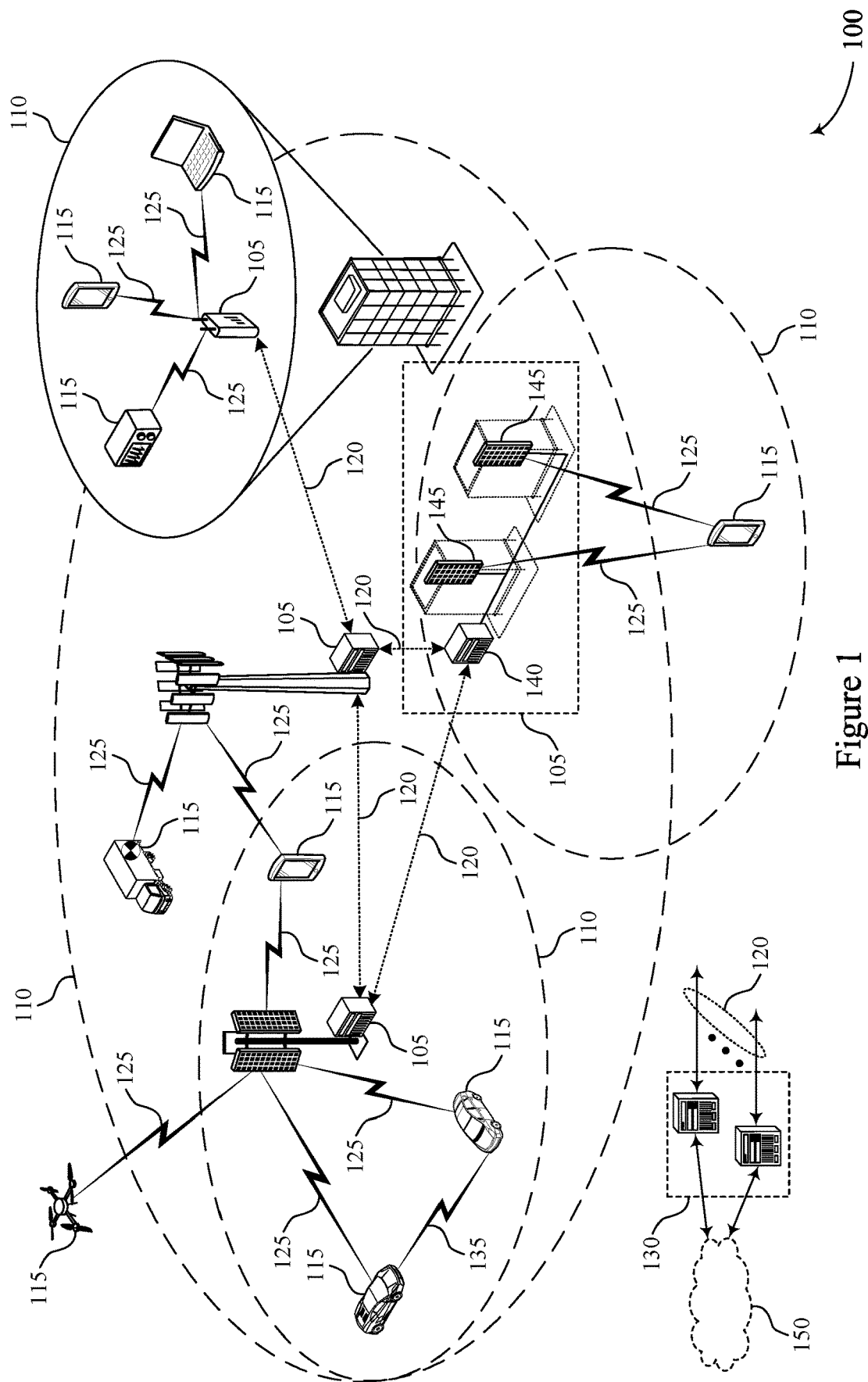
FIGS. 1 and 2 show examples of wireless communications systems that support handling missed hybrid automatic repeat request (HARQ) opportunities, multiple HARQ opportunities, or both for discontinuous reception (DRX).

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In some systems, a user equipment (UE) may support hybrid automatic repeat request (HARQ) processes while operating in a discontinuous reception (DRX) mode. In the DRX mode, the UE may switch between an active state (for example, during which the UE monitors a downlink control channel for downlink control information (DCI) messages) and an inactive state. The UE may continue operating in the active state based on one or more timers. For example, a set of timers may maintain the active state for the UE while at least one timer of the set of timers is running. Each timer may correspond to a specific activation trigger, a specific deactivation trigger, and a specific active duration. Examples of timers that maintain the active state at the UE may include an ON duration timer, an inactivity timer, and a retransmission timer. In some implementations, the UE may support other timers that may not maintain the active state, but may trigger activation of other timers or operations, such as a round-trip time (RTT) timer. If no timer maintaining the active state is currently running at the UE, the UE may operate in a sleep mode (for example, during which the UE may refrain from monitoring the downlink control channel).

In some implementations, during an active state, a UE may receive a DCI message from a base station in a control channel (such as a physical downlink control channel (PDCCH)). The DCI message may indicate a scheduled downlink transmission on a channel (such as a physical downlink shared channel (PDSCH)) as well as a feedback transmission opportunity (TxOP) for the data in the downlink transmission. The UE may receive the scheduled transmission and may transmit a HARQ positive acknowledgment (ACK) or negative acknowledgment (NACK) during the configured feedback TxOP, which may be referred to as a HARQ ACK/NACK opportunity. If the UE determines to transmit a NACK for the downlink data, the UE may trigger an RTT timer and a retransmission timer to keep the UE in the active state and monitoring for retransmission information for the data.

In some networks (such as a New Radio (NR) unlicensed network), the UE may communicate with the base station in an unlicensed spectrum. For the UE to transmit on an unlicensed channel, the UE may perform a channel access procedure, such as a listen-before-talk or listen-before-transmit (LBT) procedure, to gain access to the channel. In this way, the UE may transmit on the unlicensed channel when the channel is not being utilized by another device. In some implementations, LBT failure may occur such that the UE may not gain access to the channel during the HARQ feedback TxOP, and the UE may refrain from transmitting the HARQ feedback in the TxOP. When the UE has a NACK to transmit and LBT failure occurs (or the UE otherwise drops a feedback transmission), the UE may implement timer rules to keep the UE active and monitoring the downlink control channel.

In some implementations, the UE may activate a timer, such as an RTT timer, based on the end of a feedback TxOP (for example, as opposed to after transmitting feedback information). Activating the RTT timer based on a scheduled feedback TxOP, whether or not the UE transmits a HARQ-ACK message in the feedback TxOP, may keep the UE from returning to an inactive mode when the UE has a NACK to transmit. For example, the RTT timer may trigger a retransmission timer, and the retransmission timer may maintain the UE in the active state. Additionally, or alternatively, a base station may schedule multiple opportunities for HARQ feedback for a single downlink data message. In some implementations, the UE may start the RTT timer after the first scheduled HARQ feedback TxOP and may refrain from starting the RTT timer after subsequent scheduled HARQ feedback TxOPs for the same HARQ process. In some other implementations, the UE may start and restart the RTT timer after each scheduled HARQ feedback TxOP for the same HARQ process.

Restarting the RTT timer may trigger reactivation of the corresponding retransmission timer. In some implementations, a retransmission timer for a HARQ process may still be running when the RTT timer for the HARQ process is reactivated (for example, based on multiple feedback TxOPs). In some such implementations, the UE may continue running the retransmission timer until expiry of the RTT timer and may restart the retransmission timer upon the RTT timer expiration. In some other such implementations, the UE may stop the retransmission timer upon reactivation of the RTT timer and may restart the retransmission timer upon the RTT timer expiration.

Particular implementations of the subject matter described in this disclosure can be implemented to realize one or more of the following potential advantages. In some implementations, activating an RTT timer based on the end of a HARQ feedback TxOP may extend an active state for a UE (for example, even if the UE does not transmit the HARQ feedback in the TxOP). Extending the active state for the UE may significantly reduce the latency associated with HARQ feedback. For example, if the UE determines to transmit a NACK but returns to an inactive state prior to receiving an additional DCI message scheduling an additional feedback TxOP or a data retransmission, the UE may not transmit the NACK in a feedback message or receive a downlink data retransmission until a next DRX cycle. This may introduce significant latency into the HARQ operation and data reception, especially for relatively long DRX cycles. By activating a timer based on the end of a feedback TxOP to maintain an active state and continue monitoring the downlink control channel, the UE may receive a DCI message scheduling an additional feedback opportunity or downlink data retransmission in the current DRX cycle, supporting a faster turnaround of feedback information, data retransmission, or both. Additionally, or alternatively, managing timers for multiple feedback TxOPs for a same downlink data message may increase the likelihood that the UE remains active and transmits feedback information in the current DRX cycle.

FIG. 1 shows an example of a wireless communications system 100 that supports handling missed HARQ opportunities, multiple HARQ opportunities, or both for DRX. The wireless communications system 100 may include base stations 105, UEs 115, and a core network 130. In some implementations, the wireless communications system 100 may be an LTE network, an LTE-A network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (such as core network nodes, relay devices, integrated access and backhaul (IAB) nodes, or other network equipment), or a combination thereof, as shown in FIG. 1.

Base stations 105 may communicate with the core network 130, or with one another, or both. For example, base stations 105 may interface with the core network 130 through backhaul links 120 (such as via an S1, N2, N3, or another interface). Base stations 105 may communicate with one another over backhaul links 120 (such as via an X2, Xn, or another interface) either directly (such as directly between base stations 105), or indirectly (such as via core network 130), or both. In some implementations, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an IoT device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (such as a bandwidth part (BWP)) that is operated according to physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (such as of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some implementations, the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 megahertz (MHz)). Devices of the wireless communications system 100 (such as base stations 105, UEs 115, or both) may have hardware configurations that support communications over a particular carrier bandwidth or may be configurable to support communications over one of a set of carrier bandwidths. In some implementations, the wireless communications system 100 may include base stations 105, or UEs 115, or a combination thereof that support simultaneous communications via carriers associated with multiple carrier bandwidths. In some implementations, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of seconds, where may represent the maximum supported subcarrier spacing, and may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In some other examples, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some implementations, operations in unlicensed bands may be based on a carrier aggregation configuration in conjunction with component carriers operating in a licensed band (such as LAA).

Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as a base station 105 or a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

UEs 115 and base stations 105 may support retransmissions of data to increase the likelihood that data is received successfully. HARQ feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the medium access control (MAC) layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, a UE 115 may operate in DRX mode in a wireless communications system 100 (such as in an unlicensed spectrum or a licensed spectrum). To transmit in an unlicensed spectrum, the UE 115 may perform a channel access procedure, such as an LBT procedure, such that the UE 115 may monitor a channel prior to transmitting on the channel. The UE 115 may transmit on the channel if the channel is free from transmissions by other devices. In some implementations, LBT failure may occur such that the channel the UE 115 is monitoring may be busy during a TxOP for the UE 115. The UE 115 may refrain from transmitting a message (such as HARQ feedback) in the configured opportunity because of the LBT failure. In some implementations, to maintain the UE 115 in an active DRX state despite the LBT failure, the UE 115 may activate a timer based on the end of a feedback TxOP. Additionally, or alternatively, the UE 115 may support multiple TxOPs for a same downlink data transmission.

Figure 2:
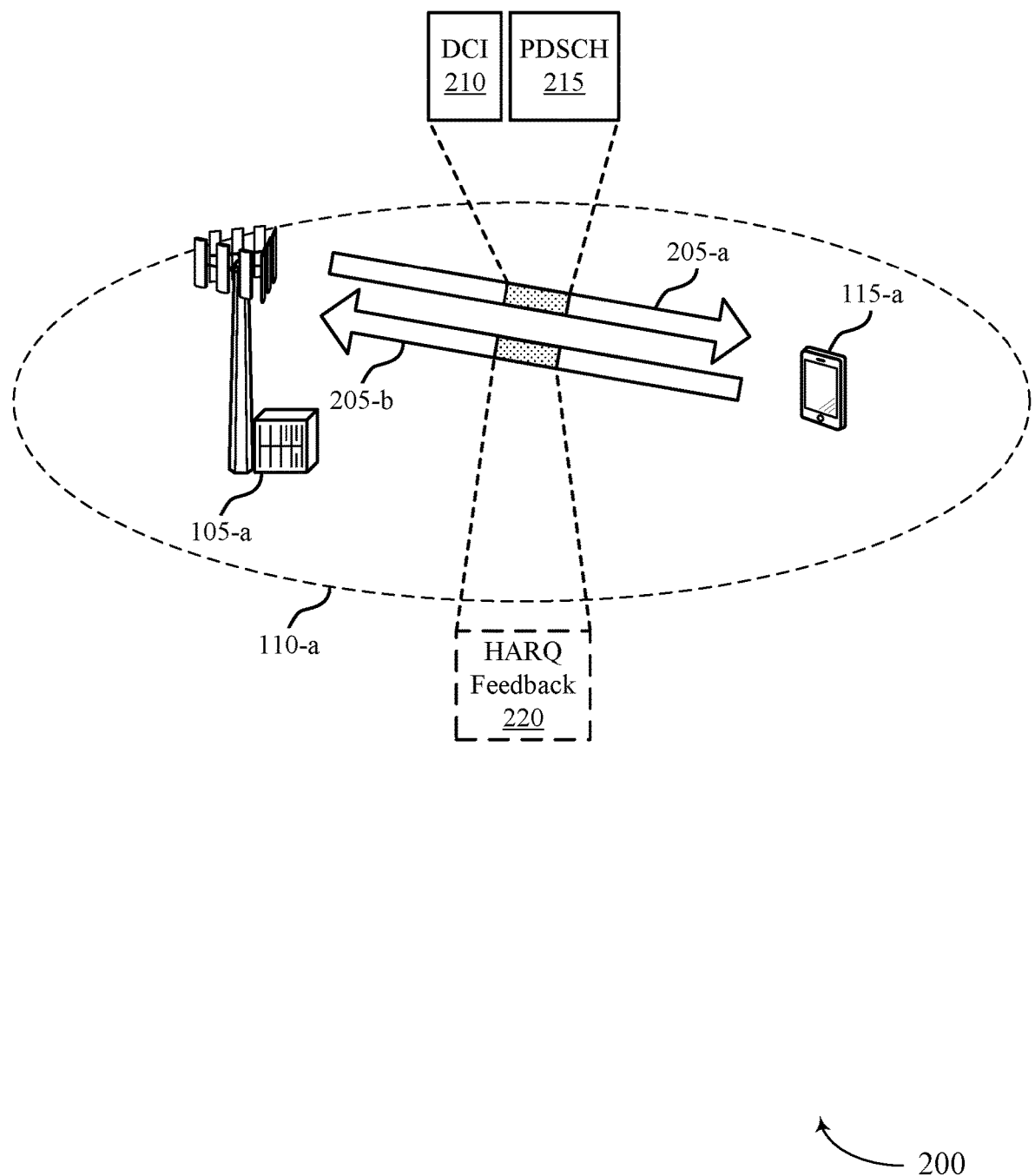

FIG. 2 shows an example of a wireless communications system 200 that supports handling missed HARQ opportunities, multiple HARQ opportunities, or both for DRX. The wireless communications system 200 may include a base station 105-a and a UE 115-a, which may be examples of a base station 105 and a UE 115 as described with reference to FIG. 1. The base station 105-a may serve a geographic coverage area 110-a. In some implementations, the base station 105-a and the UE 115-a may implement HARQ procedures while the UE 115-a operates in a DRX mode. For example, the UE 115-a may receive a DCI message 210 and a subsequent scheduled downlink data transmission 215 (for example, via one or more downlink channels 205-a) and may transmit HARQ feedback 220 (for example, via an uplink channel 205-b) based on whether the UE 115-a successfully decodes the downlink data transmission 215. The base station 105-a may determine whether to retransmit information based on received HARQ feedback 220.

A UE 115 may operate in a DRX mode to conserve battery power. In a DRX mode, the UE 115 may have an inactive mode or state (such as a low power state) and an active mode or state. In the active mode, the UE 115 may monitor a downlink control channel (for example, a downlink channel 205-a) for DCI messages 210. In the inactive mode, the UE 115 may be "asleep" and may not monitor the downlink control channel to reduce power consumption at the UE 115. The UE 115 may remain active depending on the activity of one or more timers. Timers may activate at the occurrence of certain events and remain running for a preconfigured duration. The activation of some timers may cause the UE 115 to activate (for example, wake up and begin monitoring the downlink control channel) or remain active while the activation of other timers may not impact the DRX state of the UE 115. Upon the expiry of some timers (such as at the end of a timer's runtime), the UE 115 may become inactive (for example, enter a sleep state to conserve processing power). While the UE 115 is inactive, the UE 115 may not transmit messages, receive messages, monitor a channel (such as a PDCCH), or a combination thereof.

Some examples of timers that may control the active time of a UE 115 include an ON duration timer, an inactivity timer, a retransmission timer, or some combination thereof. Additional examples of timers may include an RTT timer. For example, the UE 115 may periodically start an ON duration timer to wake up from an inactive mode. The UE 115 may start an inactivity timer (for example, a drx-InactivityTimer) after receiving a DCI message 210 scheduling a new transmission, such as a downlink data transmission 215 or an uplink transmission. The UE 115 may start an RTT timer (for example, a drx-HARQ-RTT-TimerDL) based on HARQ process for a downlink data transmission 215. The UE 115 may start a retransmission timer (for example, a drx-RetransmissionTimerDL) after the expiry of a corresponding RTT timer for a HARQ process if the UE 115 did not successfully receive data for the corresponding HARQ process. Each of these timers may have a corresponding maximum timer length. When a timer is activated, the timer may run for the maximum timer length before stopping. If all timers controlling the active time of the UE 115 are inactive (for example, after expiration of the last timer controlling the active time), the UE 115 may return to the inactive mode.

In some implementations, while in an active state, a UE 115 may receive a DCI message 210 from a base station 105 via a control channel (such as the PDCCH). The DCI message 210 may indicate a scheduled transmission on another channel (such as the PDSCH). For example, the DCI message 210 may include a downlink grant granting resources for a downlink data transmission 215. The UE 115 may receive the scheduled transmission and may transmit a HARQ ACK/NACK in a HARQ-ACK message (for example, the HARQ feedback 220) during a configured HARQ feedback TxOP. In some implementations, the UE 115 may activate one or more timers after the reception of the DCI message 210, after the transmission of the HARQ feedback 220 during a HARQ feedback TxOP, after the expiry of a previous timer, or based on any combination of these or other timer triggers. In some implementations, the base station 105-a may transmit one or more DCI messages 210 to the UE 115-a on a PDCCH. The one or more DCI messages 210 may schedule one or more future transmissions, such as a downlink data transmission 215. Additionally, or alternatively, the one or more DCI messages 210 may schedule one or more future feedback TxOPs for the HARQ feedback 220. The UE 115-a may receive the downlink data transmission 215 and may perform a HARQ process to determine feedback information for the downlink data transmission 215. The UE 115-a may transmit an ACK as a confirmation of successful receipt of the data in the downlink data transmission 215 or the UE 115-a may transmit a NACK if the UE 115-a does not successfully receive and decode the data in downlink data transmission 215.

In some implementations, prior to transmitting the HARQ feedback 220 (including one or more ACKs, NACKs, or both according to a HARQ codebook), the UE 115-a may perform a channel access procedure, such as an LBT procedure or another channel access procedure, to gain access to the uplink channel 205-b for the HARQ feedback 220 transmission. For example, if the uplink channel 205-b is an unlicensed channel (for example, the uplink channel 205-b supports one or more unlicensed radio frequency spectrum bands), the UE 115-a may monitor the uplink channel 205-b prior to transmitting on the uplink channel 205-b. The UE 115-a may transmit on the channel when the channel is not being utilized by another device. In some implementations, LBT failure may occur if the UE 115-a determines that the channel remains busy during the HARQ feedback TxOP (for example, for at least a portion of the TxOP). The UE 115-a may refrain from transmitting the HARQ feedback 220 in the HARQ feedback TxOP in some such implementations when LBT fails. In some implementations, the UE 115-a may have a NACK to transmit when LBT failure occurs. For example, the UE 115-a may fail to successfully decode the downlink data transmission 215 and also may fail to gain access to the uplink channel 205-b to transmit the corresponding HARQ feedback 220. If the UE 115-a activates a timer based on transmitting a NACK in the HARQ feedback 220, failing LBT may cause the timer to remain inactive when the timer otherwise would have activated at the successful transmission of the HARQ feedback 220. The UE 115-a may switch to an inactive mode due to the timer remaining inactive and may not transmit the NACK feedback to the base station 105 during the current ON duration for the UE 115-a. As such, the UE 115-a may not receive a retransmission of the downlink data transmission 215 missed by the UE 115-a until a subsequent ON duration, introducing significant latency into the feedback and retransmission process.

To improve the likelihood that the UE 115-a gains access to the uplink channel 205-b to transmit the HARQ feedback 220, the base station 105-a may support multiple opportunities for HARQ ACK/NACK transmission, cross-channel occupancy time (COT) HARQ-ACK feedback, or both. Additionally, or alternatively, this may improve the likelihood that the base station 105-a successfully receives the HARQ feedback 220 (for example, if reception at the base station 105-a experiences potential interference). The base station 105-a may request or trigger feedback for the downlink data transmission 215 (for example, a PDSCH message) from earlier COTs or additional reporting of earlier HARQ feedback 220. The base station 105-a may provide additional HARQ feedback timing and resources to the UE 115-a in additional DCI messages 210 (such as in the same or a different COT as a first DCI message 210 scheduling a first feedback TxOP). Accordingly, the base station 105-a may transmit more than one DCI message 210 indicating multiple HARQ feedback TxOPs for the same downlink data transmission 215. The UE 115-a may identify the more than one scheduled HARQ feedback TxOP supporting the UE 115-a transmitting the HARQ feedback 220 for the downlink data transmission 215. If the UE 115-a fails to gain access to the uplink channel 205-b in one HARQ feedback TxOP, the UE 115-a may perform a successful LBT procedure in another HARQ feedback TxOP and transmit the HARQ feedback 220 to the base station 105-a via the uplink channel 205-b.

For a HARQ codebook, such as a dynamic HARQ codebook, the base station 105-a may indicate PDSCH grouping using a group index in a DCI message 210 scheduling a PDSCH message (for example, a downlink data transmission 215). The base station 105-a may request HARQ feedback 220 in the same HARQ feedback message and TxOP for all PDSCH messages in the same group. For example, if the base station 105-a schedules three downlink data transmissions 215 to the UE 115-a and indicates that all three of the downlink data transmissions 215 belong to the same PDSCH group, the base station 105-a may schedule a HARQ feedback opportunity for the entire PDSCH group. The UE 115-a may transmit ACK/NACK information for all three of the downlink data transmissions 215 in a single HARQ feedback 220 in the HARQ feedback opportunity based on a dynamic HARQ codebook.

In some implementations, the base station 105-a may request or trigger one-shot group HARQ feedback for multiple or all configured HARQ processes (such as for non-code block group (CBG) HARQ) at the UE 115-a. For example, the base station 105-a may include a request for the one-shot group HARQ feedback in a DCI message 210. In some implementations, the request may be carried in a UE-specific DCI message carrying a physical uplink shared channel (PUSCH) grant, a UE-specific DCI message carrying a PDSCH assignment, a UE-specific DCI message not scheduling PDSCH nor PUSCH, a UE-common DCI, or some combination thereof. A UE 115 configured with a dynamic HARQ codebook, a semi-static HARQ codebook, or both may support the one-shot group HARQ feedback request.

To reduce the likelihood that a UE 115 becomes inactive without transmitting the HARQ feedback 220, the UE 115 may implement one or more timers to handle missed HARQ opportunities, multiple HARQ opportunities, or both for DRX. For example, the UE 115-*a* may activate an RTT timer based on a scheduled HARQ feedback TxOP, regardless of whether the UE 115-*a* actually transmits the HARQ feedback 220 in the TxOP. In this way, if the UE 115-*a* fails an LBT procedure or otherwise does not transmit the HARQ feedback 220, the UE 115-*a* may remain awake based on activating the RTT timer (and a corresponding retransmission timer based on the RTT timer). By remaining awake, the UE 115-*a* may identify one or more additional opportunities to transmit the HARQ feedback 220. Additionally, or alternatively, the UE 115-*a* may implement techniques for handling multiple HARQ feedback TxOPs for a single downlink data transmission 215. In some implementations, the UE 115-*a* may restart the RTT timer after each HARQ feedback TxOP (or after each HARQ feedback transmission) for the same HARQ process. In some other implementations, the UE 115-*a* may start the RTT timer after the first HARQ feedback TxOP (or after the first HARQ feedback transmission) and may not restart the RTT timer after the subsequent TxOPs or transmissions for the same HARQ process.

Figure 3:
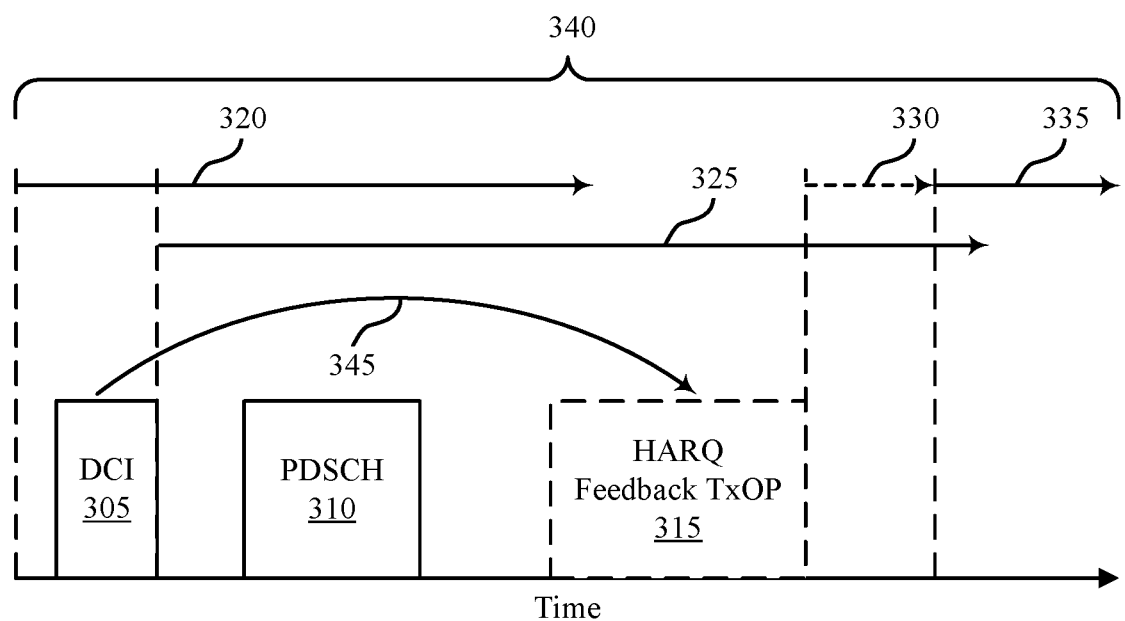
FIGS. 3 and 4 show examples of HARQ feedback procedures that support handling missed HARQ opportunities, multiple HARQ opportunities, or both for DRX.

FIG. 3 shows an example of a HARQ feedback procedure 300 that supports handling missed HARQ opportunities, multiple HARQ opportunities, or both for DRX. The HARQ feedback procedure 300 may include various timer durations, where some timers may keep a UE 115 in an active state of a DRX mode for a duration 340. While in the active state, the UE 115 may receive a DCI message 305, receive a downlink data message 310 (for example, via a PDSCH), and identify a HARQ feedback TxOP 315 for transmitting HARQ ACK/NACK feedback. In some implementations, a UE 115 as described with reference to FIGS. 1 and 2 may implement a HARQ feedback procedure while operating in a DRX mode as described with reference to FIG. 3. For example, a UE 115 may transmit HARQ feedback following the reception of a DCI message 305 and downlink data message 310. Additionally, or alternatively, other wireless devices may implement a HARQ feedback procedure.

In some operations, such as DRX operations, a UE 115 may use timers (such as a drx-InactivityTimer, a drx-HARQ-RTT-TimerDL, a drx-RetransmissionTimerDL, or some combination of these or other timers) to maintain an active state. In an active state, the UE 115 may monitor the PDCCH. The UE 115 may activate a timer based on a particular event, and the timer may remain active for a configured duration. A duration 320 may be the active duration of an "ON" timer. The duration of the "ON" timer may be configured by a base station 105 if DRX is configured at the UE 115. This timer may be responsible for the UE 115 switching to an active state, and the UE 115 may remain in the active state at least for the duration 320 regardless of the activation of other timers. A duration 340 may indicate the total active duration of the UE (for example, based on a set of timers). A duration 325 may be the active duration of a timer (such as a drx-InactivityTimer) and may start after a DCI message 305 schedules a new transmission. For example, the DCI message 305 may include a downlink grant scheduling a downlink data message 310, and the UE 115 may activate the inactivity timer in a first symbol after the DCI message 310 is received or processed based on the downlink grant. During the duration 325, the UE 115 may remain in the active state. The duration 325 may end after a pre-configured duration. The duration 320 and the duration 325 may overlap, such that the UE 115 remains active from the start of the ON duration timer to the end of the inactivity timer. In some implementations, the duration 320 may end before the duration 325, and the UE 115 may remain active because the duration 325 has not ended. In this way, the inactivity timer may extend an ON period for the UE 115 such that the UE 115 remains awake to handle a scheduled transmission. In some other implementations, the duration 325 may end before the duration 320, and the UE 115 may remain active because the duration 320 has not ended.

A duration 330 may be the active duration (for example, the runtime) of another timer (such as a drx-HARQ-RTT-TimerDL). The duration 330 may be defined per HARQ process and may start after a HARQ feedback TxOP 315. For example, the DCI message 305 may include an indication 345 scheduling the HARQ feedback TxOP 315 for the UE 115 to provide feedback information for the scheduled downlink data message 310. The duration 330 may be a preconfigured duration based on the RTT for a feedback transmission (such as a HARQ feedback transmission). The RTT may include the time for the transmission to reach a base station 105, for the base station 105 to process the feedback, for the base station 105 to prepare a message in response, for the base station 105 to transmit the message in response, and for the response message to reach the UE 115 (for example, taking into account over-the-air (OTA) delays). In some implementations, the timer associated with duration 330 may not impact the DRX state of the UE 115. For example, a running RTT timer may not keep the UE 115 in the active state. A duration 335 may be the active duration of another timer (such as a drx-RetransmissionTimerDL). During the duration 335, the UE 115 may maintain the active state of the DRX mode. The duration 335 may allow a base station 105 to transmit a retransmission to the UE 115 and may allow the UE 115 to remain awake and monitor for the retransmission. The duration 335 may be defined per HARQ process and may begin after the expiry of the RTT timer associated with the duration 330 (such as the drx-HARQ-RTT-TimerDL) if the data of the corresponding HARQ process was not successfully decoded. For example, the UE 115 may not successfully decode data transmitted by a base station 105 and may prepare a NACK to send as feedback for the data to the base station 105. The duration 335 may start after the duration 330 ends (for example, after an expiration of the RTT timer) if the UE 115 determines to transmit a NACK for the downlink data message 310 in the HARQ feedback TxOP 315 (whether or not the UE 115 actually transmits the NACK). If the UE 115 successfully decodes the downlink data message 310, the UE 115 may not activate the retransmission timer corresponding to the duration 335, as the UE 115 may not monitor for a retransmission of data already successfully received.

In unlicensed or licensed operations, a UE 115 may fail to transmit HARQ feedback in a scheduled HARQ feedback TxOP 315. For example, if the feedback is scheduled for an unlicensed channel, the UE 115 may perform an LBT procedure to gain access to the unlicensed channel for the HARQ feedback TxOP 315. If the LBT procedure fails, the UE 115 may not transmit the HARQ feedback message in the HARQ feedback TxOP 315 (for example, when operating according to an NR unlicensed operation). If the feedback is scheduled for a licensed channel, the UE 115 may drop the HARQ feedback transmission if another transmission preempts the HARQ feedback transmission. For example, a base station 105 may schedule a second transmission corresponding to a higher priority than the HARQ feedback transmission and overlapping at least partially in time with the HARQ feedback TxOP 315, and the UE 115 may refrain from transmitting the HARQ feedback transmission in the HARQ feedback TxOP 315 based on the second transmission. In some implementations, a UE 115 supporting both enhanced mobile broadband (eMBB) and enhanced URLLC (eURLLC) traffic may drop eMBB HARQ ACK/NACK feedback when in conflict with an eURLLC transmission (for example, an eURLLC HARQ ACK/NACK feedback transmission). In some other examples, a UE 115 supporting downlink PDSCH reception from multiple TRPs may provide HARQ ACK/NACK feedback to each of the TRPs. The UE 115 may drop HARQ ACK/NACK to one TRP when in conflict with the transmission of HARQ ACK/NACK to another TRP. Additionally, or alternatively, the UE 115 may support multiple HARQ feedback TxOPs 315 in licensed operations due to the possibility of dropping HARQ feedback transmissions.

To account for a missed HARQ opportunity (for example, due to LBT failure, message preemption, potential interference at a base station 105, etc.), the UE 115 may activate a timer based on the end of a HARQ feedback TxOP 315. For example, the UE 115 may activate the RTT timer corresponding to the duration 330 in a first symbol after the HARQ feedback TxOP 315 whether or not the UE 115 transmits a feedback message in the HARQ feedback TxOP 315 (for example, based on the base station 105 scheduling and irrespective of an LBT outcome for the UE 115 in unlicensed operation). Such an implementation may extend the active time of the UE 115 regardless of an actual HARQ feedback transmission, allowing the UE 115 to continue monitoring the PDCCH. The UE 115 may start the RTT timer based on a scheduled physical uplink control channel (PUCCH) opportunity for HARQ feedback, a scheduled PUSCH opportunity for HARQ feedback, or both. For example, a UE 115 may start a drx-HARQ-RTT-TimerDL for the corresponding HARQ process in the first symbol after the end of the corresponding TxOP for the downlink HARQ feedback.

Figure 4:
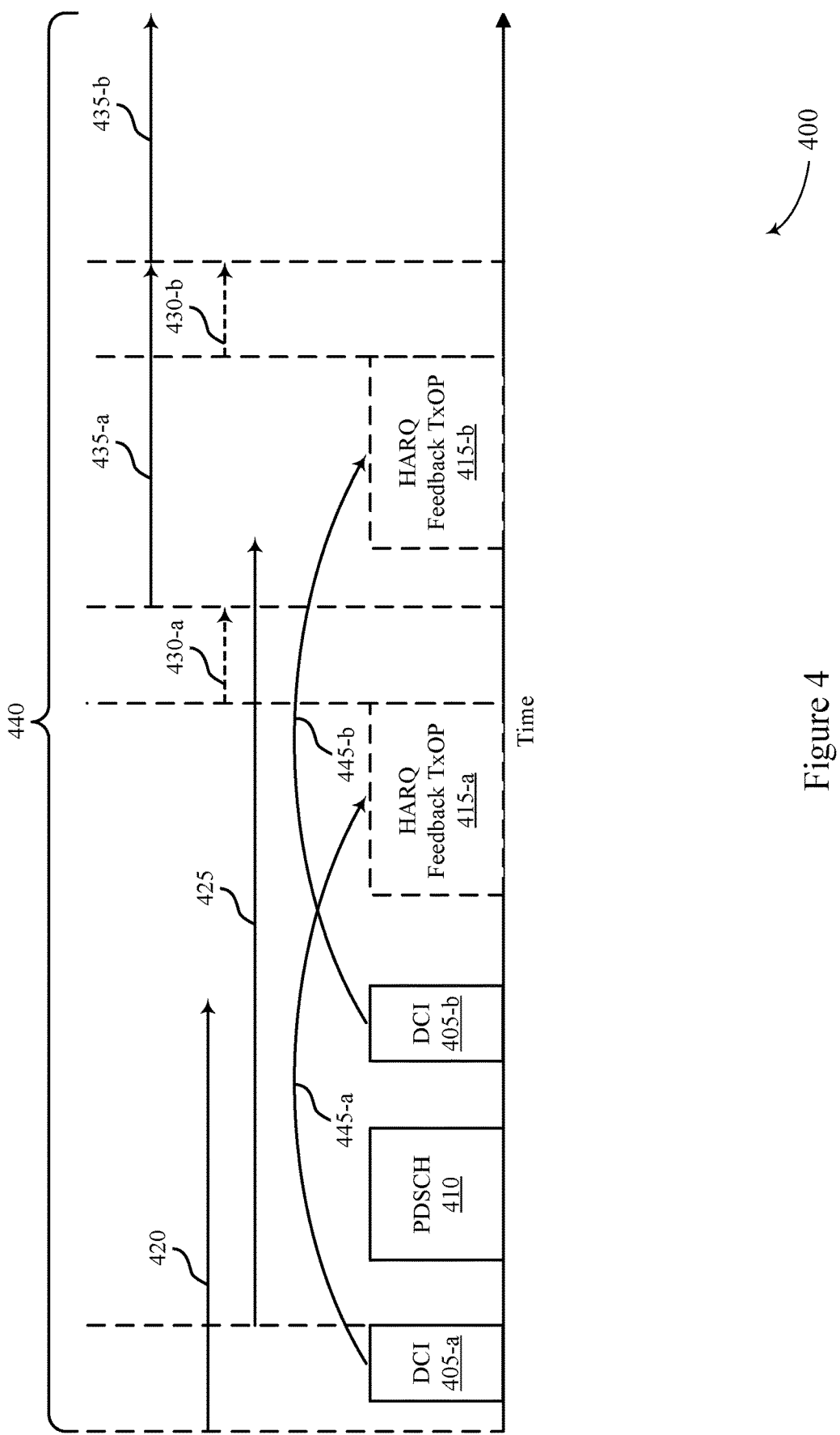

FIG. 4 shows an example of a HARQ feedback procedure 400 that supports handling missed HARQ opportunities, multiple HARQ opportunities, or both for DRX. The HARQ feedback procedure 400 may include various timer durations, where some timers may keep a UE 115 in an active state of a DRX mode for a duration 440. While in the active state, the UE 115 may receive one or more DCI messages, receive a downlink data message 410 (for example, via a PDSCH), and identify one or more HARQ feedback TxOPs for transmitting HARQ ACK/NACK feedback. In some implementations, a UE 115 as described with reference to FIGS. 1 and 2 may implement a HARQ feedback procedure 400 while operating in a DRX mode. For example, the UE 115 may transmit HARQ feedback following the reception of a DCI message and a downlink data message 410. Additionally, or alternatively, other wireless devices may implement a HARQ feedback procedure.

As described herein, in some operations (such as DRX operations), a UE 115 may use timers (such as a drx-InactivityTimer, a drx-HARQ-RTT-TimerDL, a drx-RetransmissionTimerDL, or some combination of these or other timers) to maintain an active state. The durations 420, 425, 430-*a*, 435-*a*, 430-*b*, and 435-*b* may correspond to timer durations. Based on a set of timers, the UE 115 may remain active for a total duration 440. A duration 420 may be the active duration of an "ON" timer. The "ON" timer may be responsible for the UE 115 switching to an active state, and the UE 115 may remain in the active state for at least the duration 420 regardless of the activation of other timers. A duration 425 may be the active duration of a timer (such as a drx-InactivityTimer) and may start after a DCI message 405-*a* schedules a new transmission, such as the transmission of a downlink data message 410. During the duration 425, the UE 115 may remain in the active state (for example, continuing to monitor a downlink control channel).

A duration 430-*a* may be the active duration of another timer (such as a drx-HARQ-RTT-TimerDL). The duration 430-*a* may be defined per HARQ process and may start after a HARQ feedback TxOP 415-*a*. For example, the DCI message 405-*a* granting downlink resources for the downlink data message 410 also may include an indication 445-*a* of scheduling information for a HARQ feedback TxOP 415-*a*. The UE 115 may transmit feedback information (for example, a HARQ-ACK transmission) for the downlink data message 410 in the scheduled HARQ feedback TxOP 415-*a*. The duration 430-*a* may be a preconfigured duration based on the RTT for a transmission (such as a HARQ feedback transmission) to reach a base station 105, for the base station 105 to transmit a message in response, and for the response transmission to reach the UE 115. In some implementations, an RTT timer corresponding to the duration 430-*a* may not maintain the active state of the UE 115. A duration 435-*a* may be the active duration of another timer (such as a drx-RetransmissionTimerDL) and may maintain the active state of the UE 115. The duration 435-*a* may keep the UE 115 awake and monitoring a downlink control channel, supporting reception of a retransmission from a base station 105. A retransmission timer corresponding to the duration 435-*a* may be defined per HARQ process and may begin after the expiry of an RTT timer associated with the duration 430-*a* (such as a drx-HARQ-RTT-TimerDL) if the data of the corresponding HARQ process is not successfully decoded. In some implementations, a UE 115 may not successfully decode data from a base station 105 and the UE 115 may determine to transmit a NACK to the base station 105 for the data. The retransmission timer corresponding to the duration 435-*a* may start after the duration 430-*a* ends if the UE 115 determines a NACK for the downlink data message 410.

To reduce the impact of LBT failure at a UE 115, feedback reception failure at a base station 105, or both on retransmission latency, a wireless communications system may support multiple HARQ TxOPs for a same downlink data message 410. In some implementations, a UE 115 may start an RTT timer associated with the duration 430-*a* (such as a drx-HARQ-RTT-TimerDL) after the first scheduled HARQ feedback TxOP 415-*a*. After the RTT timer associated with the duration 430-*a* expires, the UE 115 may start the retransmission timer associated with the duration 435-*a* (such as a drx-RetransmissionTimerDL) if the downlink data message 410 of the corresponding HARQ process was not successfully decoded by the UE 115. In some implementations, the base station 105 may schedule the UE 115 with another HARQ feedback TxOP 415-*b* for the downlink data message 410. In some implementations, the base station 105 may schedule the additional feedback opportunity based on the UE 115 failing to transmit HARQ feedback in the HARQ feedback TxOP 415-*a* (for example, due to LBT failure) or the base station 105 failing to receive the HARQ feedback successfully (for example, due to interference). The base station 105 may schedule the additional HARQ feedback TxOP 415-*b* using an indication 445-*b* in an additional DCI message 405-*b*. For example, the additional HARQ feedback triggering may be carried in a UE-specific DCI message carrying a PUSCH grant, a UE-specific DCI message carrying a PDSCH assignment, a UE-specific DCI message not scheduling a PDSCH or a PUSCH, a UE-common DCI message, or some combination thereof. As such, the UE 115 may receive more than one DCI message (such as DCI message 405-*a* and DCI message 405-*b*) indicating scheduled HARQ feedback opportunities for the same downlink data. For example, the DCI message 405-*b* may indicate that the HARQ feedback TxOP 415-*b* supports transmission of feedback information for the downlink data message 410.

In some implementations, the UE 115 may start the RTT timer (such as a drx-HARQ-RTT-TimerDL) corresponding to the duration 430-*a* based on the first scheduled HARQ feedback TxOP 415-*a* for a HARQ process. For example, the UE 115 may activate the RTT timer based on the end of the HARQ feedback TxOP 415-*a* or based on the end of a HARQ feedback transmission in the HARQ feedback TxOP 415-*a*. In some implementations, the HARQ feedback TxOP 415-*b* may be triggered by a UE-specific DCI message 405-*b* carrying an additional PDSCH assignment. In some such implementations, the UE 115 may activate an additional RTT timer corresponding to the HARQ process for the additional PDSCH assignment, and the additional RTT timer (and a corresponding additional retransmission timer) may keep the UE 115 in the active state. In some other implementations, the HARQ feedback TxOP 415-*b* may be triggered by a UE-specific DCI message 405-*b* carrying a PUSCH grant, and the UE 115 may start uplink timers following the HARQ feedback TxOP 415-*b* triggered by the DCI with the uplink grant (such as a drx-HARQ-RTT-TimerUL and a drx-RetransmissionTimerUL after expiration of the drx-HARQ-RTT-TimerUL). In some implementations, the uplink timers (such as the drx-HARQ-RTT-TimerUL, the drx-RetransmissionTimerUL, or both) may be configured differently than the downlink timers (such as the drx-HARQ-RTT-TimerDL, the drx-RetransmissionTimerDL, or both). In some implementations, the uplink timers may be shorter than the corresponding downlink timers, and the UE 115 may fail to be in an active state to monitor a potential PDCCH if an uplink RTT timer is activated based on the HARQ feedback TxOP 415-*b*. In some such implementations, the UE 115 may activate a downlink RTT timer based on the HARQ feedback TxOP 415-*b* to keep the UE 115 in the active state, even if the HARQ feedback TxOP 415-*b* is scheduled in a DCI message 405-*b* containing an uplink grant.

In some other implementations, the HARQ feedback TxOP 415-*b* may be triggered by a UE-specific DCI message 405-*b* that does not schedule PDSCH nor PUSCH, or the HARQ feedback TxOP 415-*b* may be triggered by a UE-common DCI message 405-*b*. In some such implementations, the DCI message 405-*b* may not be associated with either an uplink grant or a downlink grant. In some implementations, the UE 115 may implement techniques to activate an RTT timer following the HARQ feedback TxOP 415-*b* even if the DCI message 405-*b* does not correspond to an uplink timer or a downlink timer, such that the UE 115 may remain in the active state following the HARQ feedback TxOP 415-*b*.

In some implementations, the UE 115 may activate the downlink RTT timer corresponding to the duration 430-*a* following the first HARQ feedback TxOP 415-*a* and may not reactive the downlink RTT timer following additional HARQ feedback TxOPs (such as the HARQ feedback TxOP 415-*b*) corresponding to the same HARQ process. In some other implementations, the UE 115 may start and restart the downlink RTT timer associated with the duration 430-*a* and the duration 430-*b* (such as a drx-HARQ-RTT-TimerDL) after each scheduled HARQ feedback TxOP for a HARQ process (for example, after the HARQ feedback TxOP 415-*a* and after the HARQ feedback TxOP 415-*b*). Based on reactivating the downlink RTT timer after the additional HARQ feedback TxOP 415-*b*, the UE 115 may trigger reactivation of the corresponding retransmission timer corresponding to the duration 435-*b* (for example, if the UE 115 determines a NACK for the corresponding downlink data message 410), keeping the UE 115 active and monitoring the downlink control channel for an additional DCI message. In some such implementations, the UE 115 may activate and reactivate the RTT timer, the retransmission timer, or both after each scheduled HARQ feedback TxOP based on the end of the HARQ feedback TxOP or based on each actual HARQ feedback transmission in a HARQ feedback TxOP.

If the UE 115 is scheduled with multiple HARQ feedback TxOPs, the UE 115 may activate the RTT timer for a HARQ process when the retransmission timer for the same HARQ process is still running. For example, the duration 435-*a* for the retransmission timer based on a first HARQ feedback TxOP 415-*a* may still be active when the duration 430-*b* for the RTT timer is activated based on the second HARQ feedback TxOP 415-*b*. In some implementations, the UE 115 may keep the retransmission timer running when reactivating the RTT timer and may restart the retransmission timer when the reactivated RTT timer expires. Restarting the retransmission timer may involve resetting the retransmission timer to a maximum duration 435-*b* for the retransmission timer upon the expiration of the reactivated RTT timer. In some other implementations, the UE 115 may stop the retransmission timer upon reactivating the RTT timer. In some such other implementations, the UE 115 may reactivate the retransmission timer with its full duration 435-*b* upon expiry of the reactivated RTT timer. Based on stopping the retransmission timer, the UE 115 may not monitor for a retransmission or a DCI message scheduling a retransmission while the reactivated RTT timer is running.

Figure 5:
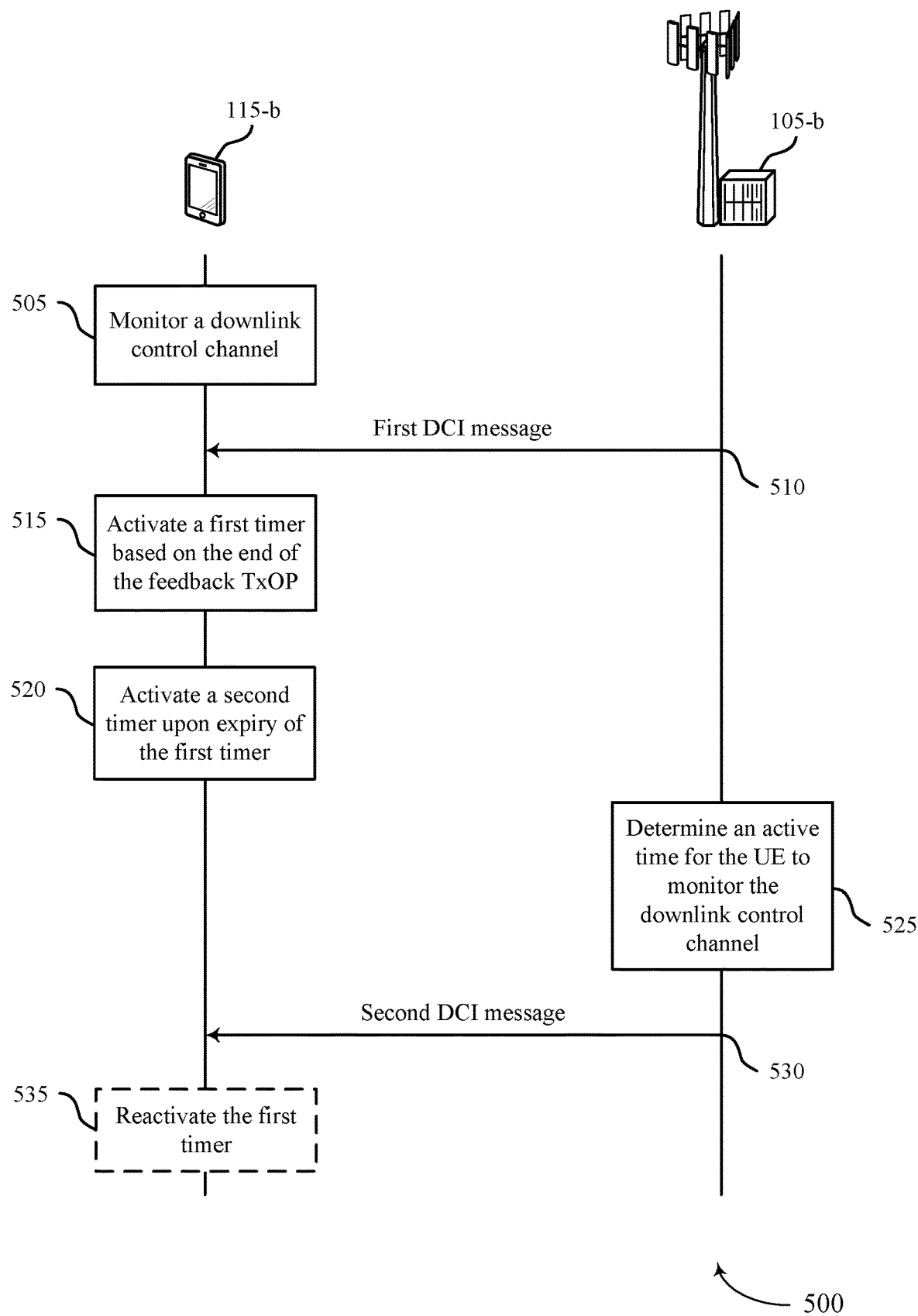
FIG. 5 shows an example of a process flow that supports handling missed HARQ opportunities, multiple HARQ opportunities, or both for DRX.

FIG. 5 shows an example of a process flow 500 that supports handling missed HARQ opportunities, multiple HARQ opportunities, or both for DRX. The process flow 500 may illustrate an example HARQ process for DRX. For example, a UE 115-*b* may perform a HARQ process for PDSCH data in order to transmit HARQ feedback to a base station 105-*b* while operating timers in accordance with DRX operation. The base station 105-*b* and the UE 115-*b* may be examples of the corresponding wireless devices described with reference to FIGS. 1-4. Alternative examples of the following may be implemented, where some operations are performed in a different order than described or are not performed at all. In some implementations, operations may include additional features not mentioned below, or further operations may be added.

At 505, the UE 115-*b* may monitor a downlink control channel while operating in an active state of a DRX mode. The active state of the UE 115-*b* may be turned on by a timer (such as an ON timer). At 510, the base station 105-*b* may transmit, to the UE 115-*b* and via a downlink control channel (such as a PDCCH), a first DCI message scheduling a downlink data message and indicating a feedback TxOP for the downlink data message. The UE 115-*b* may receive the downlink data message via a channel (such as a PDSCH). If the UE 115-*b* correctly receives and decodes the downlink data message, the UE 115-*b* may transmit an ACK during the feedback TxOP. If the UE 115-*b* incorrectly receives or decodes the downlink data message, the UE 115-*b* may transmit a NACK during the feedback TxOP. The feedback TxOP may be on an unlicensed channel. In some implementations, the UE 115-*b* may perform an LBT procedure for the feedback TxOP, where the UE 115-*b* may refrain from transmitting a feedback message in the feedback TxOP based on the UE 115-*b* failing the LBT procedure for the feedback TxOP. Additionally, or alternatively, the feedback TxOP may be on a licensed channel. In some such implementations, the UE 115-*b* may refrain from transmitting the feedback message in the feedback TxOP based on another message with a higher priority preempting the feedback message transmission.

At 515, the UE 115-*b* may activate a first timer subsequent to the feedback TxOP for the downlink data message and based on the end of the feedback TxOP. The first timer may be an RTT timer (such as a DRX-HARQ-RTT-TimerDL) and may be activated in a first symbol in time after the feedback TxOP. The first timer may account for the amount of time for a HARQ feedback transmission to reach the base station 105-*b* from the UE 115-*b*, for the base station 105-*b* to transmit a message in response, and for the response message to reach the UE 115-*b* for reception. The first timer may not impact the activity of the UE 115-*b*, such that the UE 115-*b* may become inactive during the first timer's duration if all other DRX timers are inactive. At 520, the UE 115-*b* may activate a second timer upon expiration of the first timer, where the UE 115-*b* may remain in the active state of the DRX mode while the second timer is running. The second timer may be a retransmission timer (such as a DRX-RetransmissionTimerDL) and may be activated in a first symbol in time after the expiration of the RTT timer.

At 525, the base station 105-*b* may determine an active time that the UE 115-*b* is monitoring the downlink control channel based on an RTT timer and a retransmission timer, where the RTT timer may be activated based on the end of the feedback TxOP. In some implementations, the base station 105-*b* may determine the active time for the UE 115-*b* based on the RTT timer remaining deactivated subsequent to any additional, subsequent feedback TxOPs for the downlink data message. In some other implementations, the base station 105-*b* may determine the active time for the UE 115-*b* based on the RTT timer reactivating based on additional, subsequent feedback TxOPs for the downlink data message. At 530, the base station 105-*b* may transmit, to the UE 115-*b* and via the downlink control channel, a second DCI message during the determined active time for the UE 115-*b*.

At 535, the UE 115-*b* may reactivate the first timer (such as the RTT timer) corresponding to the HARQ process subsequent to the second feedback TxOP for the downlink data message and based on the end of the second feedback TxOP. Alternatively, the UE 115-*b* may refrain from reactivating the first timer (such as the RTT timer) corresponding to the HARQ process subsequent to the second feedback TxOP for the downlink data message and based on the end of the second feedback TxOP being subsequent to the end of the first feedback TxOP.

Figure 6:
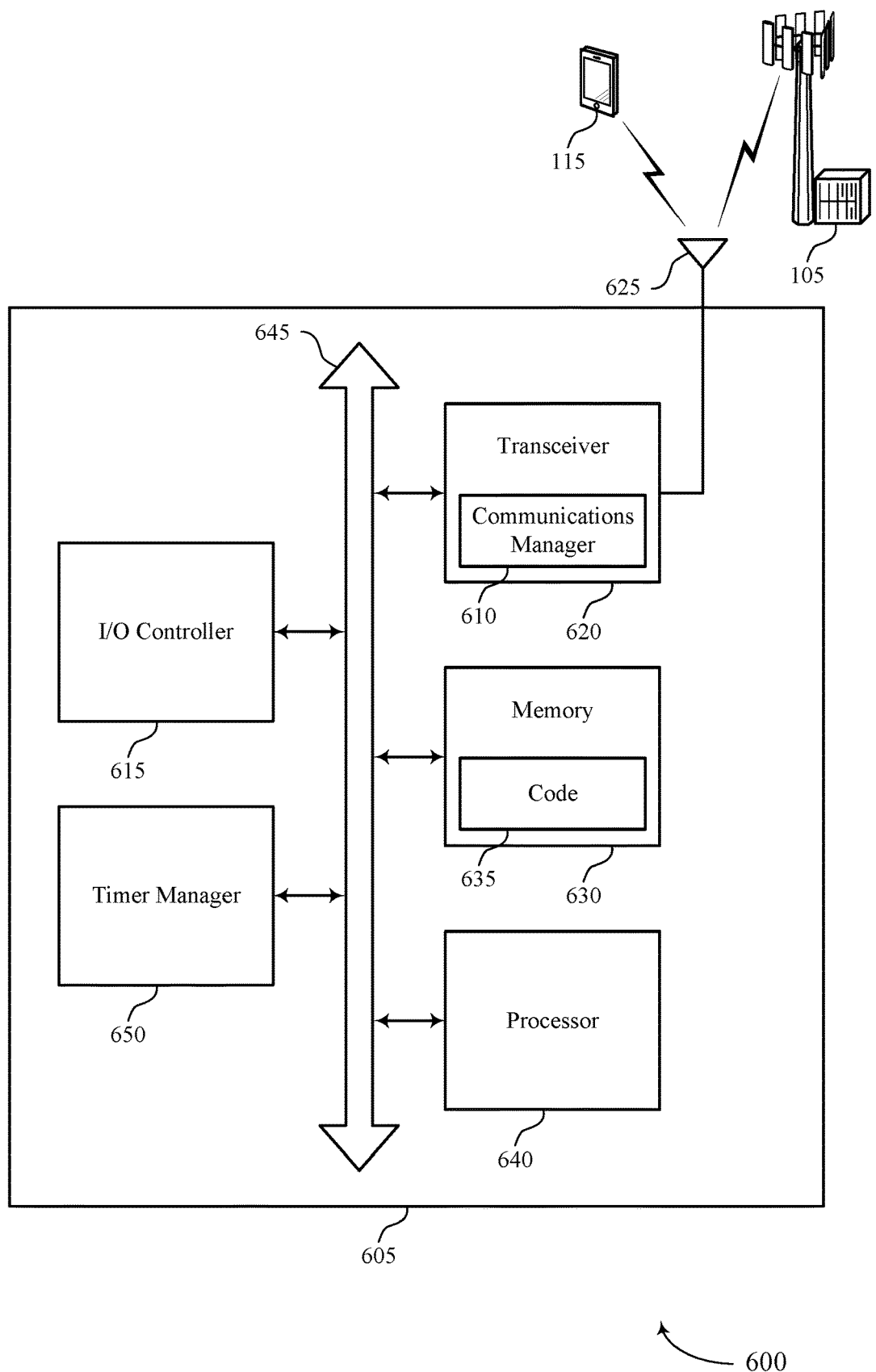
FIGS. 6 and 7 show block diagrams of example devices that support handling missed HARQ opportunities, multiple HARQ opportunities, or both for DRX.

FIG. 6 shows a block diagram 600 of an example device 605 that supports handling missed HARQ opportunities, multiple HARQ opportunities, or both for DRX. The device 605 may be an example of a UE 115. The device 605 may include components for bi-directional voice and data communications including components for transmitting and receiving communications, such as a communications manager 610, an input/output (I/O) controller 615, a transceiver 620, an antenna 625, memory 630, a processor 640, and a timer manager 650. These components may be in electronic communication via one or more buses (such as a bus 645).

The communications manager 610 may monitor a downlink control channel while operating in an active state of a DRX mode and may receive, via the downlink control channel, a DCI message scheduling a downlink data message, where the DCI message indicates a feedback TxOP for the downlink data message. The timer manager 650 may activate a first timer subsequent to the feedback TxOP for the downlink data message and based on the end of the feedback TxOP and may activate a second timer upon expiration of the first timer, where the device 605 (such as the UE 115) remains in the active state of the DRX mode while the second timer is running.

In some implementations, the communications manager 610 may receive a first DCI message scheduling a downlink data message, where the first DCI message indicates a first feedback TxOP for a HARQ process for the downlink data message. The timer manager 650 may activate an RTT timer corresponding to the HARQ process subsequent to the first feedback TxOP for the downlink data message and based on the end of the first feedback TxOP. The communications manager 610 may additionally receive a second DCI message indicating a second feedback TxOP for the HARQ process for the downlink data message subsequent to the first feedback TxOP and the timer manager 650 may reactivate the RTT timer corresponding to the HARQ process subsequent to the second feedback TxOP for the downlink data message and based on the end of the second feedback TxOP.

In some other implementations, the communications manager 610 may receive a first DCI message scheduling a downlink data message, where the first DCI message indicates a first feedback TxOP for a HARQ process for the downlink data message. The timer manager 650 may activate an RTT timer corresponding to the HARQ process subsequent to the first feedback TxOP for the downlink data message and based on the end of the first feedback TxOP. The communications manager 610 may additionally receive a second DCI message indicating a second feedback TxOP for the HARQ process for the downlink data message subsequent to the first feedback TxOP and the timer manager 650 may refrain from reactivating the RTT timer corresponding to the HARQ process subsequent to the second feedback TxOP for the downlink data message and based on the end of the second feedback TxOP being subsequent to the end of the first feedback TxOP.

The I/O controller 615 may manage input and output signals for the device 605. The I/O controller 615 also may manage peripherals not integrated into the device 605. In some implementations, the I/O controller 615 may represent a physical connection or port to an external peripheral. In some implementations, the I/O controller 615 may utilize an operating system such as iOS®, ANDROID®, MS-DOS®, MS-WINDOWS®, OS/2®, UNIX®, LINUX®, or another known operating system. In some other implementations, the I/O controller 615 may represent or interact with a modem, a keyboard, a mouse, a touchscreen, or a similar device. In some implementations, the I/O controller 615 may be implemented as part of a processor. In some implementations, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 also may include a modem to modulate the packets and provide the modulated packets to the antennas for transmission, and to demodulate packets received from the antennas. In some implementations, the communications manager 610 may be a component of or connected to the transceiver 620.

In some implementations, the wireless device may include a single antenna 625. However, in some other examples, the device may have more than one antenna 625, which may be capable of concurrently transmitting or receiving multiple wireless transmissions.

The memory 630 may include random-access memory (RAM) and read-only memory (ROM). The memory 630 may store computer-readable, computer-executable code 635 including instructions that, when executed, cause the processor to perform various functions described herein. In some implementations, the memory 630 may contain, among other things, a basic I/O system (BIOS) which may control basic hardware or software operation such as the interaction with peripheral components or devices.

The processor 640 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 640 may be configured to operate a memory array using a memory controller. In some other implementations, a memory controller may be integrated into the processor 640. The processor 640 may be configured to execute computer-readable instructions stored in a memory (such as the memory 630) to cause the device 605 to perform various functions (for example, functions or tasks supporting HARQ in a DRX mode).

The code 635 may include instructions to implement aspects of the present disclosure, including instructions to support wireless communications. The code 635 may be stored in a non-transitory computer-readable medium such as system memory or other type of memory. In some implementations, the code 635 may not be directly executable by the processor 640 but may cause a computer (when compiled and executed) to perform functions described herein.

Additionally, or alternatively, the device 605 may include one or more interfaces and a processing system. The processing system may be in electronic communication with the one or more interfaces. In some implementations, the interfaces and processing system may be components of a chip or modem, which may be a component of the device 605. The processing system and one or more interfaces may include aspects of the communications manager 610, the timer manager 650, the memory 630, the processor 640, or a combination thereof. The processing system and one or more interfaces also may be in electronic communication with the I/O controller 615, the transceiver 620, one or more antennas 625, or a combination thereof (such as via the bus 645).

For example, a first interface may be configured to obtain information from other components of the device 605. A second interface may be configured to output information to other components of the device 605. The information may be sent and received in the form of encoded or unencoded bits. The processing system may perform any number of processes to modify or determine the information output from the second interface.

Similarly, in some implementations, a first interface may be configured to output information to other components of the device 605. A second interface may be configured to obtain information from other components of the device 605. The information may be sent and received in the form of encoded or unencoded bits. The processing system may perform any number of processes to modify or determine the information output from the first interface.

The first interface may be configured to obtain monitoring information for a downlink control channel while operating in an active state of a DRX mode and obtain (for example, via the downlink control channel), a DCI message scheduling a downlink data message, where the DCI message indicates a feedback TxOP for the downlink data message. The processing system may be configured to activate a first timer subsequent to the feedback TxOP for the downlink data message and based on an end of the feedback TxOP and activate a second timer upon expiration of the first timer, where the processing system remains in the active state of the DRX mode while the second timer is running.

In some implementations, the first interface may be configured to obtain a first DCI message scheduling a downlink data message, where the first DCI message indicates a first feedback TxOP for a HARQ process for the downlink data message. The processing system may activate an RTT timer corresponding to the HARQ process subsequent to the first feedback TxOP for the downlink data message and based on an end of the first feedback TxOP. The first interface may be further configured to obtain a second DCI message indicating a second feedback TxOP for the HARQ process for the downlink data message subsequent to the first feedback TxOP, and the processing system may be further configured to reactivate the RTT timer corresponding to the HARQ process subsequent to the second feedback TxOP for the downlink data message and based on an end of the second feedback TxOP.

In some other implementations, the first interface may be configured to obtain a first DCI message scheduling a downlink data message, where the first DCI message indicates a first feedback TxOP for a HARQ process for the downlink data message. The processing system may be configured to activate an RTT timer corresponding to the HARQ process subsequent to the first feedback TxOP for the downlink data message and based on an end of the first feedback TxOP. The first interface may be further configured to obtain a second DCI message indicating a second feedback TxOP for the HARQ process for the downlink data message subsequent to the first feedback TxOP, and the processing system may be configured to refrain from reactivating the RTT timer corresponding to the HARQ process subsequent to the second feedback TxOP for the downlink data message and based on an end of the second feedback TxOP being subsequent to the end of the first feedback TxOP.

Figure 7:
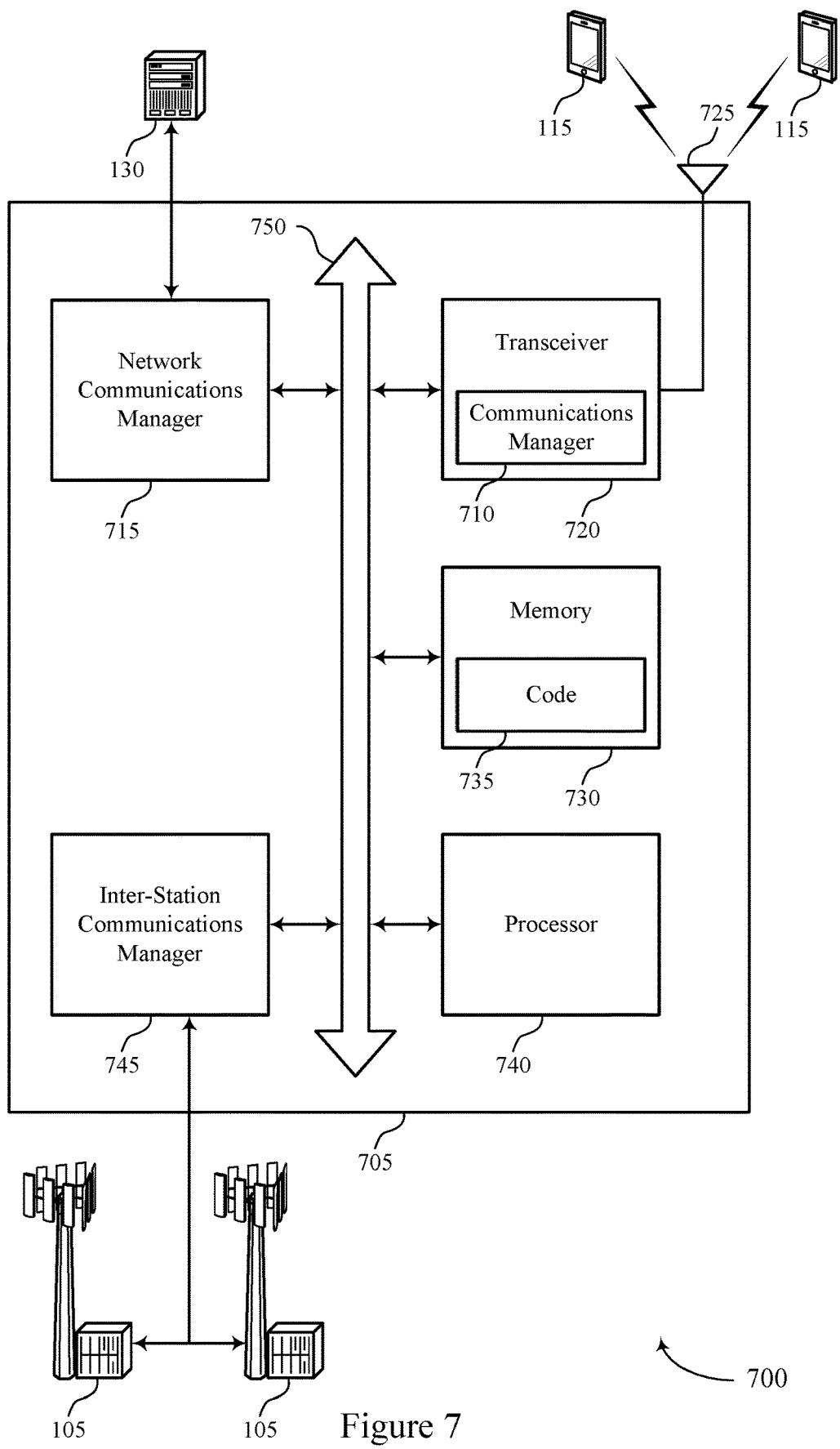

FIG. 7 shows a block diagram 700 of an example device 705 that supports handling missed HARQ opportunities, multiple HARQ opportunities, or both for DRX. The device 705 may be an example of a base station 105. The device 705 may include components for bi-directional voice and data communications including components for transmitting and receiving communications, such as a communications manager 710, a network communications manager 715, a transceiver 720, an antenna 725, memory 730, a processor 740, and an inter-station communications manager 745. These components may be in electronic communication via one or more buses (such as a bus 750).

The communications manager 710 may transmit, to a UE and via a downlink control channel, a first DCI message scheduling a downlink data message and indicating a feedback TxOP for the downlink data message. The communications manager 710 may further determine an active time for the UE to monitor the downlink control channel based on an RTT timer and a retransmission timer, where the RTT timer is activated based on an end of the feedback TxOP. For example, the RTT timer may be activated subsequent to the feedback TxOP for the downlink data message and based on the end of the feedback TxOP, and the retransmission timer may be activated based on an expiration of the RTT timer. The UE may actively monitor the downlink control channel while the retransmission timer is running. The communications manager 710 may transmit, to the UE and via the downlink control channel, a second DCI message during the determined active time for the UE.

The network communications manager 715 may manage communications with the core network 130 (for example, via one or more wired backhaul links). For example, the network communications manager 715 may manage the transfer of data communications for client devices, such as one or more UEs 115.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas. In some implementations, the communications manager 710 may be a component of or connected to the transceiver 720.

In some implementations, the wireless device may include a single antenna 725. However, in some other examples, the device may have more than one antenna 725, which may be capable of concurrently transmitting or receiving multiple wireless transmissions.

The memory 730 may include RAM, ROM, or a combination thereof. The memory 730 may store computer-readable code 735 including instructions that, when executed by a processor (such as the processor 740) cause the device to perform various functions described herein. In some implementations, the memory 730 may contain, among other things, a BIOS which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 740 may be configured to operate a memory array using a memory controller. In some implementations, a memory controller may be integrated into the processor 740. The processor 740 may be configured to execute computer-readable instructions stored in a memory (for example, the memory 730) to cause the device 705 to perform various functions (such as functions or tasks supporting HARQ handling for DRX).

The inter-station communications manager 745 may manage communications with other base station 105 and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some implementations, the inter-station communications manager 745 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some implementations, the code 735 may not be directly executable by the processor 740 but may cause a computer (when compiled and executed) to perform functions described herein.

Additionally, or alternatively, the device 705 may include one or more interfaces and a processing system. The processing system may be in electronic communication with the one or more interfaces. In some implementations, the interfaces and processing system may be components of a chip or modem, which may be a component of the device 705. The processing system and one or more interfaces may include aspects of the communications manager 710, the memory 730, the processor 740, or a combination thereof. The processing system and one or more interfaces also may be in electronic communication with the network communications manager 715, the inter-station communications manager 745, the transceiver 720, one or more antennas 725, or a combination thereof (such as via the bus 750).

For example, a first interface may be configured to output information to other components of the device 705. A second interface may be configured to obtain information from other components of the device 705. The information may be sent and received in the form of encoded or unencoded bits. The processing system may perform any number of processes to modify or determine the information output from the first interface.

Similarly, in some implementations, a first interface may be configured to obtain information from other components of the device 705. A second interface may be configured to output information to other components of the device 705. The information may be sent and received in the form of encoded or unencoded bits. The processing system may perform any number of processes to modify or determine the information output from the second interface.

In some implementations, the first interface may be configured to output (such as to a UE and via a downlink control channel based on the transceiver 720) a first DCI message scheduling a downlink data message and indicating a feedback TxOP for the downlink data message. The processing system may be configured to determine an active time for the UE to monitor the downlink control channel based on an RTT timer and a retransmission timer, where the RTT timer is activated based on an end of the feedback TxOP. The first interface may be further configured to output (such as to the UE and via the downlink control channel) a second DCI message during the determined active time for the UE.

Figure 8:
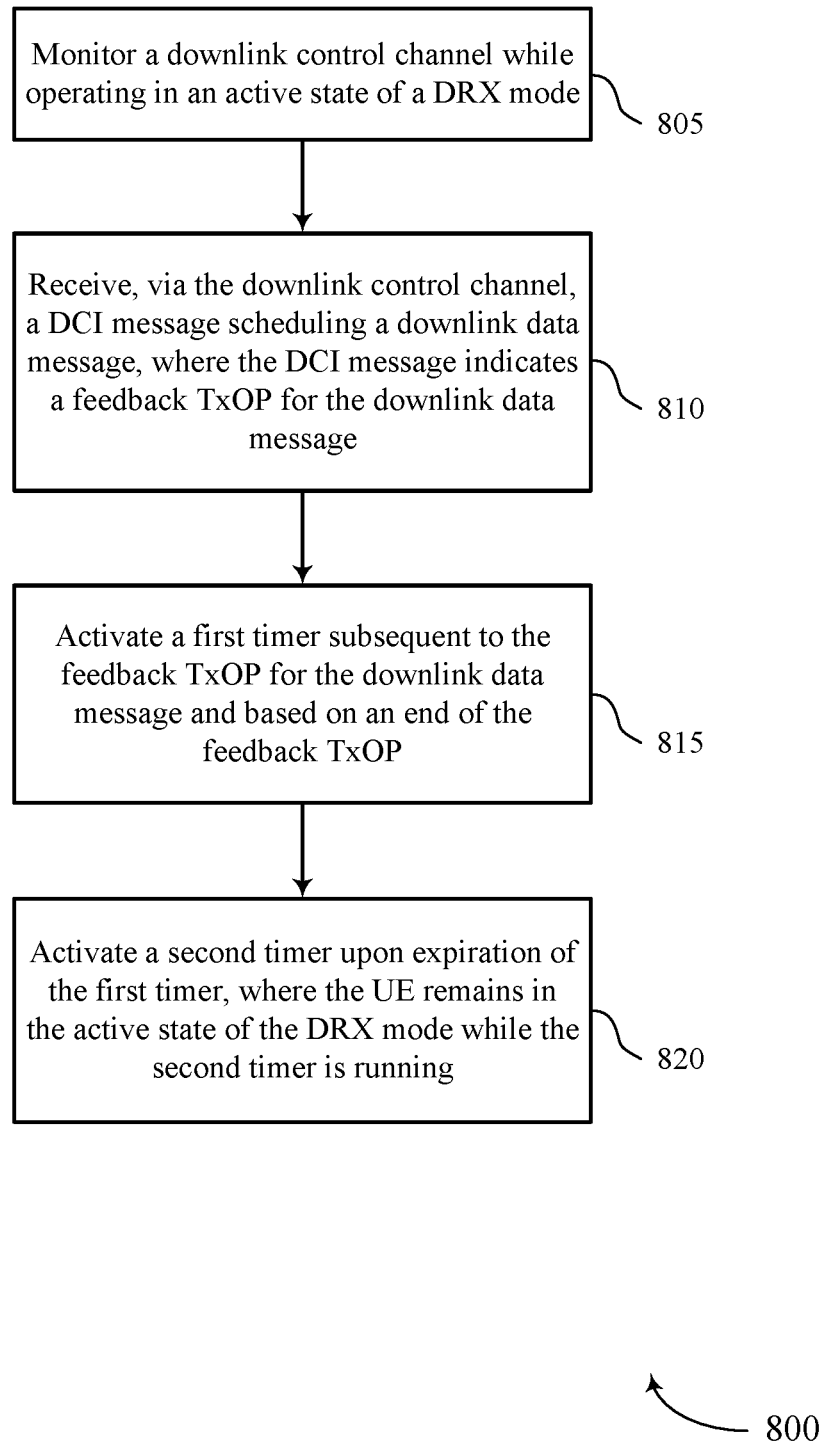
FIGS. 8-12 show flowcharts illustrating example methods for handling missed HARQ opportunities, multiple HARQ opportunities, or both for DRX.

FIG. 8 shows a flowchart illustrating an example method 800 for handling missed HARQ opportunities, multiple HARQ opportunities, or both for DRX. The operations of the method 800 may be implemented by a UE 115 or its components as described herein. For example, the operations of the method 800 may be performed by a communications manager, a timer manager, or both as described with reference to FIG. 6. In some implementations, a UE 115 may execute a set of instructions to control the functional elements of the UE 115 to perform the functions described below. Additionally, or alternatively, a UE 115 may perform aspects of the functions described below using special-purpose hardware.

At 805, the UE 115 may monitor a downlink control channel while operating in an active state of a DRX mode. The operations of 805 may be performed according to the methods described herein.

At 810, the UE 115 may receive, via the downlink control channel, a DCI message scheduling a downlink data message, where the DCI message indicates a feedback TxOP for the downlink data message. The operations of 810 may be performed according to the methods described herein.

At 815, the UE 115 may activate a first timer subsequent to the feedback TxOP for the downlink data message and based on an end of the feedback TxOP. The operations of 815 may be performed according to the methods described herein.

At 820, the UE 115 may activate a second timer upon expiration of the first timer, where the UE 115 remains in the active state of the DRX mode while the second timer is running. The operations of 820 may be performed according to the methods described herein.

Figure 9:
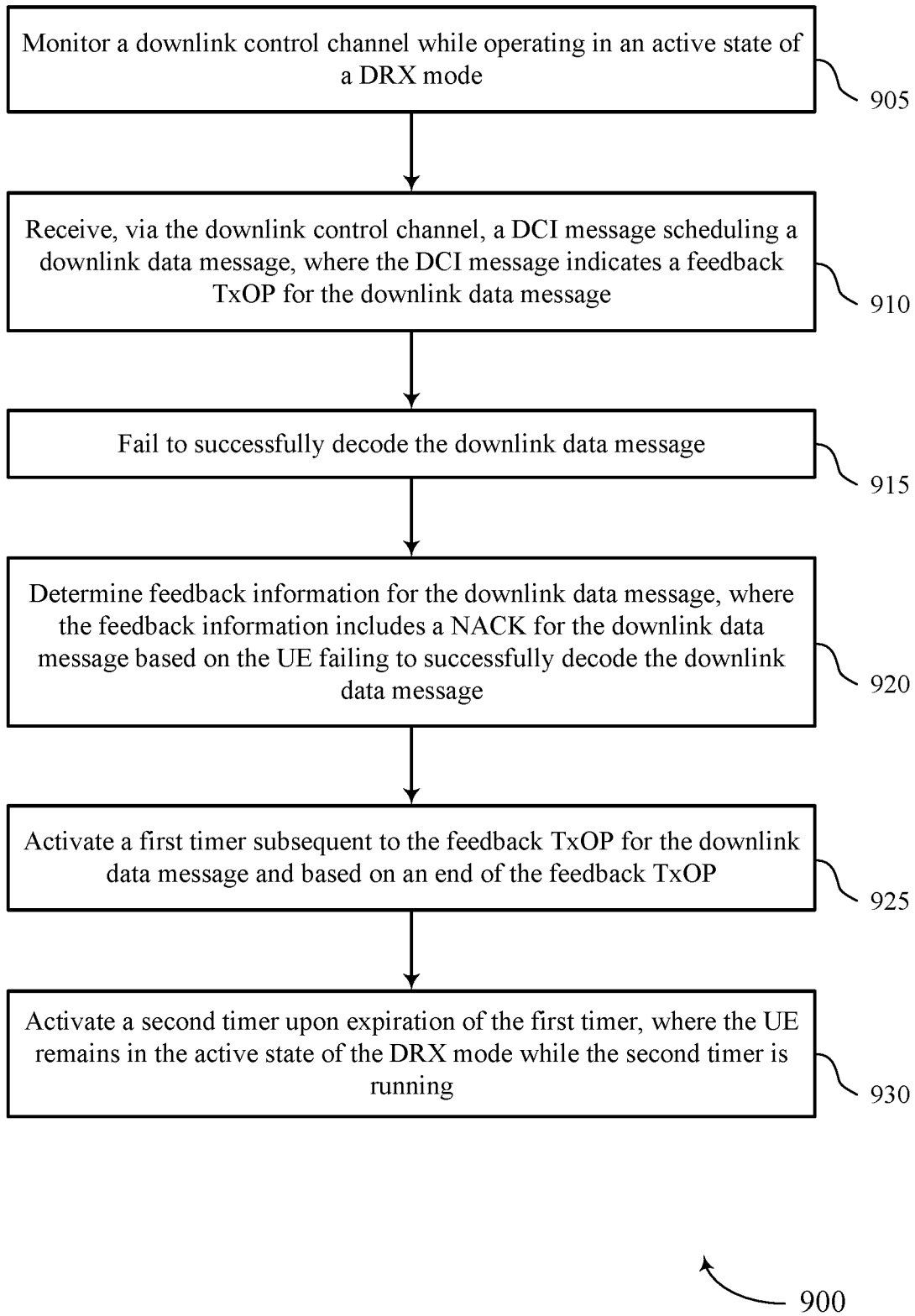

FIG. 9 shows a flowchart illustrating an example method 900 for handling missed HARQ opportunities, multiple HARQ opportunities, or both for DRX. The operations of the method 900 may be implemented by a UE 115 or its components as described herein. For example, the operations of the method 900 may be performed by a communications manager, a timer manager, or both as described with reference to FIG. 6. In some implementations, a UE 115 may execute a set of instructions to control the functional elements of the UE 115 to perform the functions described below. Additionally, or alternatively, a UE 115 may perform aspects of the functions described below using special-purpose hardware.

At 905, the UE 115 may monitor a downlink control channel while operating in an active state of a DRX mode. The operations of 905 may be performed according to the methods described herein.

At 910, the UE 115 may receive, via the downlink control channel, a DCI message scheduling a downlink data message, where the DCI message indicates a feedback TxOP for the downlink data message. The operations of 910 may be performed according to the methods described herein.

At 915, the UE 115 may fail to successfully decode the downlink data message. The operations of 915 may be performed according to the methods described herein.

At 920, the UE 115 may determine feedback information for the downlink data message, where the feedback information includes a NACK for the downlink data message based on the UE 115 failing to successfully decode the downlink data message, and where a first timer, a second timer, or both are activated based on the feedback information including the NACK. The operations of 920 may be performed according to the methods described herein.

At 925, the UE 115 may activate the first timer subsequent to the feedback TxOP for the downlink data message and based on an end of the feedback TxOP. The operations of 925 may be performed according to the methods described herein.

At 930, the UE 115 may activate the second timer upon expiration of the first timer, where the UE 115 remains in the active state of the DRX mode while the second timer is running. The operations of 930 may be performed according to the methods described herein.

Figure 10:
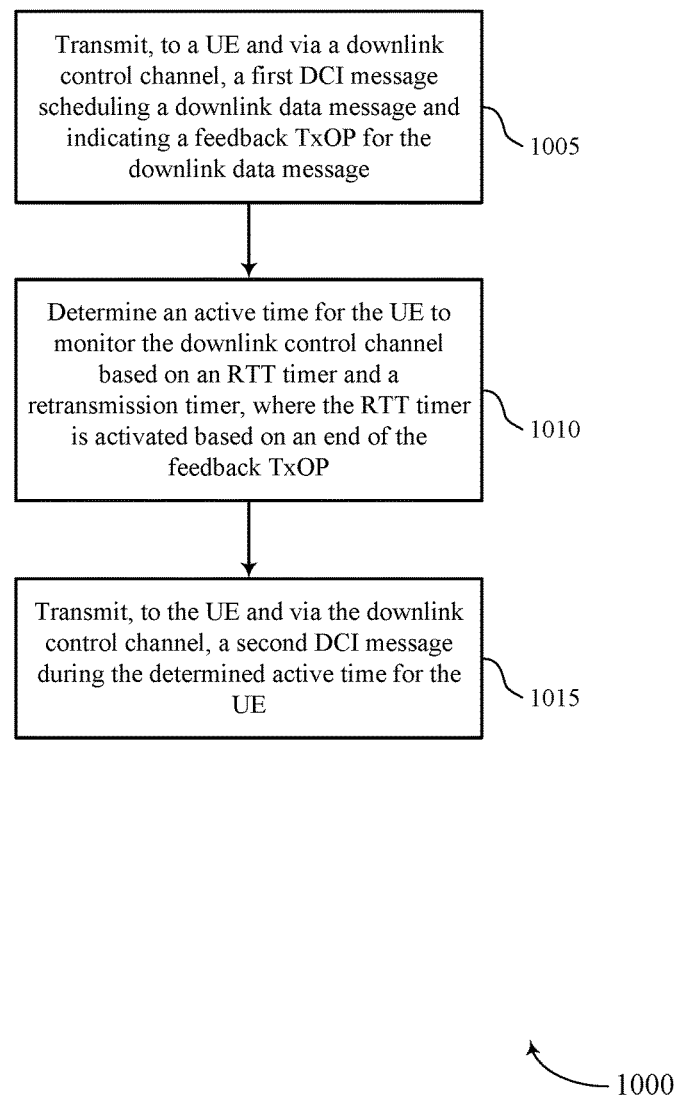

FIG. 10 shows a flowchart illustrating an example method 1000 for handling missed HARQ opportunities, multiple HARQ opportunities, or both for DRX. The operations of the method 1000 may be implemented by a base station 105 or its components as described herein. For example, the operations of the method 1000 may be performed by a communications manager as described with reference to FIG. 7. In some implementations, a base station 105 may execute a set of instructions to control the functional elements of the base station 105 to perform the functions described below. Additionally, or alternatively, a base station 105 may perform aspects of the functions described below using special-purpose hardware.

At 1005, the base station 105 may transmit, to a UE 115 and via a downlink control channel, a first DCI message scheduling a downlink data message and indicating a feedback TxOP for the downlink data message. The operations of 1005 may be performed according to the methods described herein.

At 1010, the base station 105 may determine an active time for the UE 115 to monitor the downlink control channel based on an RTT timer and a retransmission timer, where the RTT timer is activated based on an end of the feedback TxOP. The operations of 1010 may be performed according to the methods described herein.

At 1015, the base station 105 may transmit, to the UE 115 and via the downlink control channel, a second DCI message during the determined active time for the UE 115. The operations of 1015 may be performed according to the methods described herein.

Figure 11:
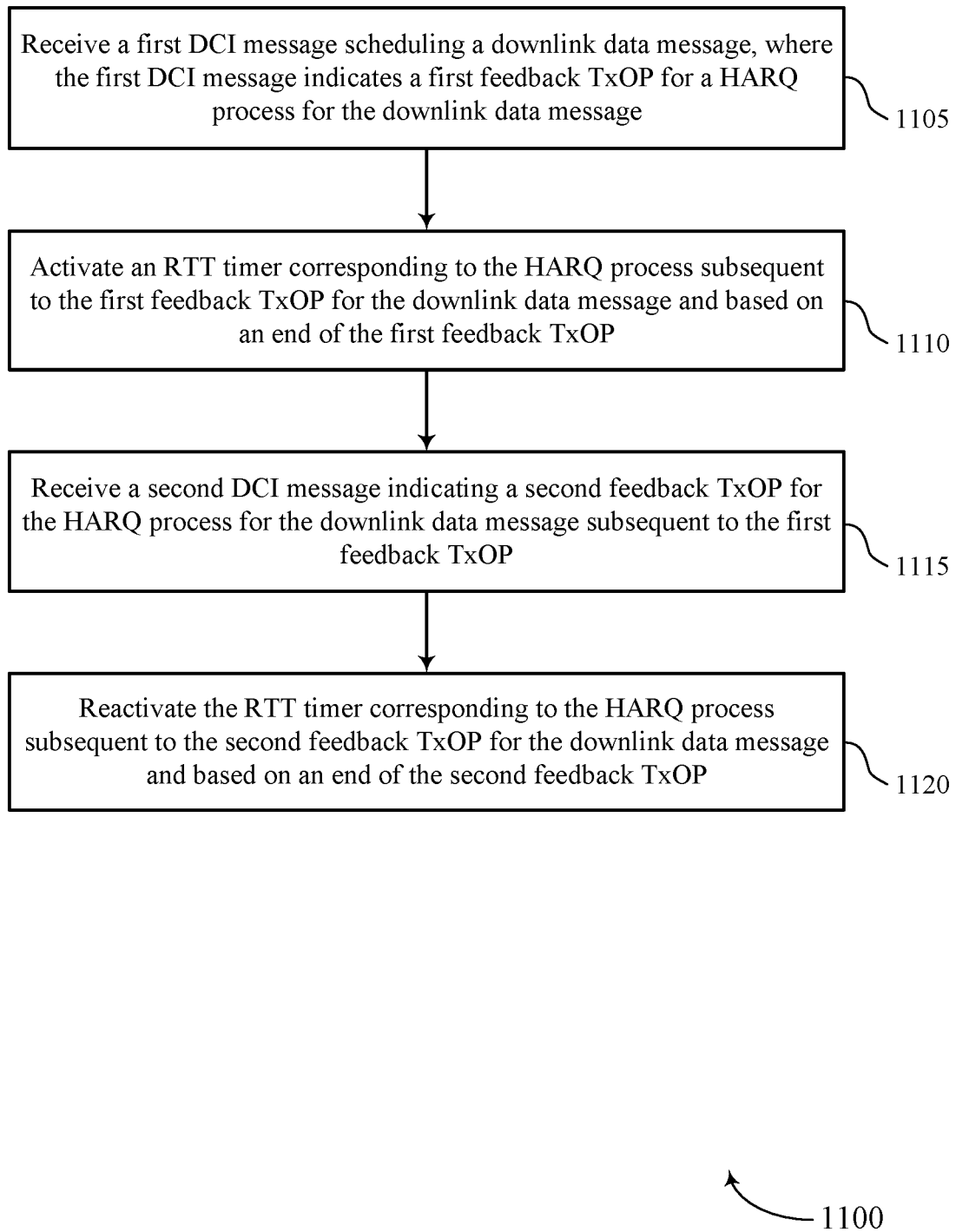

FIG. 11 shows a flowchart illustrating an example method 1100 for handling missed HARQ opportunities, multiple HARQ opportunities, or both for DRX. The operations of the method 1100 may be implemented by a UE 115 or its components as described herein. For example, the operations of the method 1100 may be performed by a communications manager, a timer manager, or both as described with reference to FIG. 6. In some implementations, a UE 115 may execute a set of instructions to control the functional elements of the UE 115 to perform the functions described below. Additionally, or alternatively, a UE 115 may perform aspects of the functions described below using special-purpose hardware.

At 1105, the UE 115 may receive a first DCI message scheduling a downlink data message, where the first DCI message indicates a first feedback TxOP for a HARQ process for the downlink data message. The operations of 1105 may be performed according to the methods described herein.

At 1110, the UE 115 may activate an RTT timer corresponding to the HARQ process subsequent to the first feedback TxOP for the downlink data message and based on an end of the first feedback TxOP. The operations of 1110 may be performed according to the methods described herein.

At 1115, the UE 115 may receive a second DCI message indicating a second feedback TxOP for the HARQ process for the downlink data message subsequent to the first feedback TxOP. The operations of 1115 may be performed according to the methods described herein.

At 1120, the UE 115 may reactivate the RTT timer corresponding to the HARQ process subsequent to the second feedback TxOP for the downlink data message and based on an end of the second feedback TxOP. The operations of 1120 may be performed according to the methods described herein.

Figure 12:
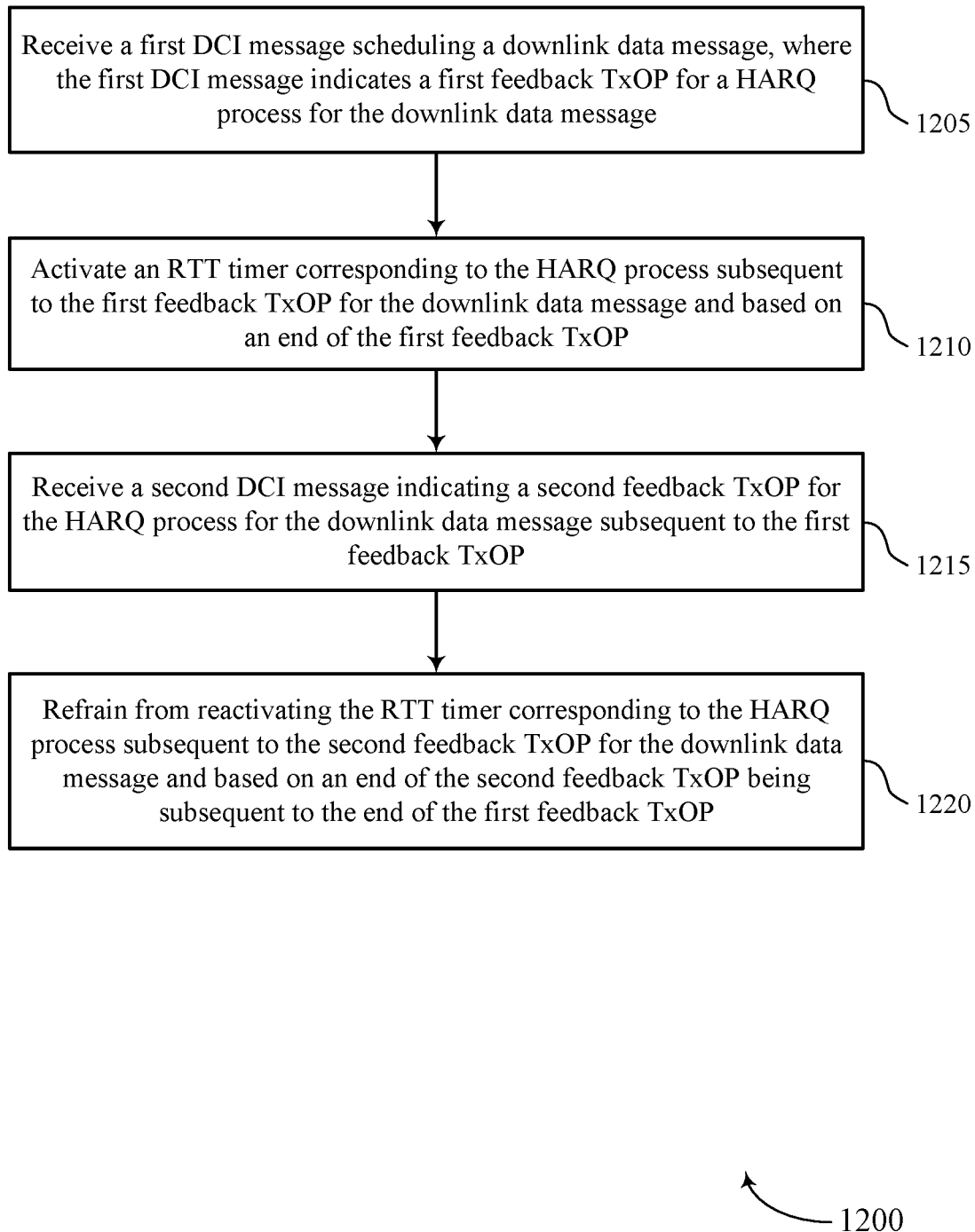

FIG. 12 shows a flowchart illustrating an example method 1200 for handling missed HARQ opportunities, multiple HARQ opportunities, or both for DRX. The operations of the method 1200 may be implemented by a UE 115 or its components as described herein. For example, the operations of the method 1200 may be performed by a communications manager, a timer manager, or both as described with reference to FIG. 6. In some implementations, a UE 115 may execute a set of instructions to control the functional elements of the UE 115 to perform the functions described below. Additionally, or alternatively, a UE 115 may perform aspects of the functions described below using special-purpose hardware.

At 1205, the UE 115 may receive a first DCI message scheduling a downlink data message, where the first DCI message indicates a first feedback TxOP for a HARQ process for the downlink data message. The operations of 1205 may be performed according to the methods described herein.

At 1210, the UE 115 may activate an RTT timer corresponding to the HARQ process subsequent to the first feedback TxOP for the downlink data message and based on an end of the first feedback TxOP. The operations of 1210 may be performed according to the methods described herein.

At 1215, the UE 115 may receive a second DCI message indicating a second feedback TxOP for the HARQ process for the downlink data message subsequent to the first feedback TxOP. The operations of 1215 may be performed according to the methods described herein.

At 1220, the UE 115 may refrain from reactivating the RTT timer corresponding to the HARQ process subsequent to the second feedback TxOP for the downlink data message and based on an end of the second feedback TxOP being subsequent to the end of the first feedback TxOP. The operations of 1220 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications, comprising:
   a first interface configured to:
     obtain monitoring information for a downlink control channel while operating in an active state of a discontinuous reception (DRX) mode; and
     obtain a downlink control information (DCI) message scheduling a downlink data message based at least in part on the monitoring information, wherein the DCI message indicates a feedback transmission opportunity (TxOP) for the downlink data message; and
   a processing system configured to:
     activate a first timer subsequent to the feedback TxOP for the downlink data message and based at least in part on an end of the feedback TxOP; and
     activate a second timer upon expiration of the first timer, wherein the processing system remains in the active state of the DRX mode while the second timer is running.

2. The apparatus of claim 1, wherein the first interface is further configured to:
   obtain an additional DCI message, wherein the additional DCI message indicates an additional feedback TxOP for the downlink data message subsequent to the feedback TxOP.

3. The apparatus of claim 2, wherein the processing system is further configured to:
   reactivate the first timer subsequent to the additional feedback TxOP for the downlink data message and based at least in part on an end of the additional feedback TxOP; and
   reactivate the second timer upon expiration of the reactivated first timer.

4. The apparatus of claim 3, wherein the second timer is running at the expiration of the reactivated first timer based at least in part on activating the second timer upon the expiration of the first timer, and wherein reactivating the second timer comprises:
   resetting the second timer to a maximum second timer duration based at least in part on the expiration of the reactivated first timer.

5. The apparatus of claim 3, wherein the second timer is running at the end of the additional feedback TxOP based at least in part on activating the second timer upon the expiration of the first timer, the processing system further configured to:
   stop the second timer subsequent to the additional feedback TxOP based at least in part on reactivating the first timer; and reset the second timer to a maximum second timer duration based at least in part on the expiration of the reactivated first timer, wherein reactivating the second timer upon expiration of the reactivated first timer is based at least in part on the resetting.

6. The apparatus of claim 3, wherein the first timer is running at the end of the additional feedback TxOP based at least in part on activating the first timer subsequent to the feedback TxOP, and wherein reactivating the first timer comprises:
   resetting the first timer to a maximum first timer duration based at least in part on the end of the additional feedback TxOP.

7. The apparatus of claim 2, wherein the DCI message corresponds to a first hybrid automatic repeat request (HARQ) process, the processing system further configured to:
   activate an additional timer subsequent to the additional feedback TxOP for the downlink data message and based at least in part on the additional DCI message corresponding to a second HARQ process different than the first HARQ process.

8. The apparatus of claim 2, wherein:
   the additional DCI message comprises a UE-specific uplink grant, a UE-specific downlink assignment, UE-specific control information, common UE control information, or a combination thereof.

9. The apparatus of claim 1, wherein the processing system fails to successfully decode the downlink data message and is further configured to:
   determine feedback information for the downlink data message, wherein the feedback information comprises a negative acknowledgment for the downlink data message based at least in part on the processing system failing to successfully decode the downlink data message, and wherein the first timer, the second timer, or both are activated based at least in part on the feedback information comprising the negative acknowledgment.

10. The apparatus of claim 1, wherein the processing system is further configured to refrain from outputting a feedback message for the downlink data message in the feedback TxOP.

11. The apparatus of claim 10, wherein the feedback TxOP is on an unlicensed channel, the processing system further configured to:
   perform a channel access procedure for the feedback TxOP, wherein the refraining is based at least in part on the processing system failing the channel access procedure for the feedback TxOP.

12. The apparatus of claim 10, wherein the feedback TxOP is on a licensed channel and the feedback message corresponds to a first priority value, the processing system further configured to:
   identify a second TxOP for a second message at least partially overlapping the feedback TxOP, wherein the second message corresponds to a second priority value that is greater than the first priority value and the refraining is based at least in part on the second message.

13. The apparatus of claim 10, wherein the feedback TxOP is on a licensed channel, the processing system further configured to:
   identify a second TxOP for a second message at least partially overlapping the feedback TxOP, wherein the second message preempts the feedback message and the refraining is based at least in part on the second message.

14. The apparatus of claim 1, further comprising:
a second interface configured to:
  output a feedback message for the downlink data message in the feedback TxOP.

15. The apparatus of claim 1, wherein:
the first timer comprises a round-trip time (RTT) timer and is activated in a first symbol in time after the feedback TxOP; and
the second timer comprises a retransmission timer and is activated in a first symbol in time after the expiration of the RTT timer.

16. The apparatus of claim 15, wherein:
the RTT timer comprises a DRX-HARQ-RTT-TimerDL; and
the retransmission timer comprises a DRX-RetransmissionTimerDL.

17. The apparatus of claim 1, wherein:
the processing system is further configured to:
  identify an expiration of a last timer maintaining the processing system in the active state of the DRX mode; and
  enter an inactive state of the DRX mode based at least in part on the expiration of the last timer; and
the first interface is further configured to:
  refrain from obtaining monitoring information for the downlink control channel while in the inactive state of the DRX mode.

18. The apparatus of claim 1, wherein:
the feedback TxOP comprises a downlink hybrid automatic repeat request (HARD) acknowledgment feedback TxOP.

19. An apparatus for wireless communications, comprising:
a first interface configured to:
  output a first downlink control information (DCI) message for a user equipment (UE) scheduling a downlink data message and indicating a feedback transmission opportunity (TxOP) for the downlink data message; and
a processing system configured to:
  determine an active time for the UE to monitor a downlink control channel based at least in part on a round-trip time (RTT) timer and a retransmission timer, wherein the RTT timer is activated based at least in part on an end of the feedback TxOP,
the first interface further configured to:
  output a second DCI message for the UE during the determined active time for the UE.

20. The apparatus of claim 19, wherein:
the RTT timer is activated subsequent to the feedback TxOP for the downlink data message and based at least in part on the end of the feedback TxOP; and
the retransmission timer is activated based at least in part on an expiration of the RTT timer.

21. The apparatus of claim 19, wherein:
the second DCI message indicates a second feedback TxOP for the downlink data message subsequent to the feedback TxOP.

22. The apparatus of claim 21, wherein determining the active time for the UE further comprises:
determining the active time for the UE to monitor the downlink control channel based at least in part on the RTT timer being reactivated subsequent to the second feedback TxOP for the downlink data message and based at least in part on an end of the second feedback TxOP and the retransmission timer being reactivated based at least in part on a second expiration of the RTT timer.

23. An apparatus for wireless communications, comprising:
a first interface configured to:
  obtain a first downlink control information (DCI) message scheduling a downlink data message, wherein the first DCI message indicates a first feedback transmission opportunity (TxOP) for a hybrid automatic repeat request (HARQ) process for the downlink data message; and
a processing system configured to:
  activate a round-trip time (RTT) timer corresponding to the HARQ process subsequent to the first feedback TxOP for the downlink data message and based at least in part on an end of the first feedback TxOP,
the first interface further configured to:
  obtain a second DCI message indicating a second feedback TxOP for the HARQ process for the downlink data message subsequent to the first feedback TxOP, and
the processing system further configured to:
  reactivate the RTT timer corresponding to the HARQ process subsequent to the second feedback TxOP for the downlink data message and based at least in part on an end of the second feedback TxOP.

24. The apparatus of claim 23, wherein the first interface is further configured to:
obtain monitoring information for a downlink control channel while operating in an active state of a discontinuous reception (DRX) mode, wherein obtaining the first DCI message and obtaining the second DCI are based at least in part on the monitoring information.

25. The apparatus of claim 24, wherein the processing system is further configured to:
identify a first expiration of the RTT timer based at least in part on activating the RTT timer;
activate a retransmission timer based at least in part on the first expiration of the RTT timer, wherein the processing system operates in the active state of the DRX mode based at least in part on the activated retransmission timer;
identify a second expiration of the RTT timer based at least in part on reactivating the RTT timer; and
reactivate the retransmission timer based at least in part on the second expiration of the RTT timer, wherein the processing system operates in the active state of the DRX mode based at least in part on the reactivated retransmission timer.

26. The apparatus of claim 25, wherein the retransmission timer is running at the second expiration of the RTT timer based at least in part on activating the retransmission timer, and wherein reactivating the retransmission timer comprises:
resetting the retransmission timer to a maximum timer duration based at least in part on the second expiration of the RTT timer.

27. The apparatus of claim 25, wherein the retransmission timer is running at the reactivation of the RTT timer based at least in part on activating the retransmission timer, the processing system further configured to:
stop the retransmission timer subsequent to the second feedback TxOP based at least in part on reactivating the RTT timer; and
reset the retransmission timer to a maximum timer duration based at least in part on the second expiration of the RTT timer, wherein reactivating the retransmission timer is based at least in part on the resetting.

28. A method for wireless communications at an apparatus of a user equipment (UE), comprising:
monitoring a downlink control channel while operating in an active state of a discontinuous reception mode (DRX);
receiving, via the downlink control channel, a downlink control information (DCI) message scheduling a downlink data message, wherein the DCI message indicates a feedback transmission opportunity (TxOP) for the downlink data message;
activating a first timer subsequent to the feedback TxOP for the downlink data message and based at least in part on an end of the feedback TxOP; and
activating a second timer upon expiration of the first timer, wherein the UE remains in the active state of the DRX mode while the second timer is running.

29. The method of claim 28, further comprising:
receiving, via the downlink control channel, an additional DCI message, wherein the additional DCI message indicates an additional feedback TxOP for the downlink data message subsequent to the feedback TxOP.

30. The method of claim 29, further comprising:
reactivating the first timer subsequent to the additional feedback TxOP for the downlink data message and based at least in part on an end of the additional feedback TxOP; and
reactivating the second timer upon expiration of the reactivated first timer.

* * * * *